(12) United States Patent
Lee et al.

(10) Patent No.: US 11,108,604 B2
(45) Date of Patent: Aug. 31, 2021

(54) DRIVER ARCHITECTURE FOR MULTIPHASE AND AMPLITUDE ENCODING TRANSMITTERS

(71) Applicant: QUALCOMM Incorporated, San Diego, CA (US)

(72) Inventors: Chulkyu Lee, San Diego, CA (US); Dhaval Sejpal, San Diego, CA (US); George Alan Wiley, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/984,896

(22) Filed: Aug. 4, 2020

(65) Prior Publication Data

US 2021/0058280 A1     Feb. 25, 2021

Related U.S. Application Data

(60) Provisional application No. 62/888,995, filed on Aug. 19, 2019.

(51) Int. Cl.
| | |
|---|---|
| *H04B 1/00* | (2006.01) |
| *H04L 27/20* | (2006.01) |
| *H04L 27/233* | (2006.01) |
| *H04L 27/227* | (2006.01) |

(52) U.S. Cl.
CPC ...... *H04L 27/2014* (2013.01); *H04L 27/2278* (2013.01); *H04L 27/2332* (2013.01)

(58) Field of Classification Search
CPC ............. H04L 27/2014; H04L 27/2332; H04L 27/2278
USPC .......................................................... 375/140
See application file for complete search history.

(56) References Cited

U.S. PATENT DOCUMENTS

| | | | | |
|---|---|---|---|---|
| 9,520,988 | B1* | 12/2016 | Wiley | ............... H04L 27/20 |
| 9,577,854 | B1* | 2/2017 | Hollis | ............ G06F 13/4068 |
| 2015/0201052 | A1 | 7/2015 | Li et al. | |
| 2015/0331611 | A1 | 11/2015 | Hansen et al. | |
| 2016/0330048 | A1* | 11/2016 | Tseng | ................. H04L 65/607 |

OTHER PUBLICATIONS

International Search Report and Written Opinion—PCT/US2020/045041—ISA/EPO—dated Nov. 2, 2020.

\* cited by examiner

*Primary Examiner* — Tanmay K Shah

(74) *Attorney, Agent, or Firm* — Chui-kiu Teresa Wong

(57) ABSTRACT

Certain disclosed methods, apparatus, and systems enable improved communication on a multiphase communication link through improved encoding techniques and protocol. A data communication apparatus has a plurality of line drivers configured to couple the apparatus to a 3-wire link, and a data encoder configured to encode at least 3 bits of binary data in each transition between two symbols that are consecutively transmitted by the plurality of line drivers over the 3-wire link such that each pair of consecutively-transmitted symbols comprises two different symbols. Each symbol defines signaling states of the 3-wire link during an associated symbol transmission interval such that each wire of the 3-wire link is in a different signaling state from the other wires of the 3-wire link during the associated symbol transmission interval. Data may be encoded using a combination of 3-phase and pulse amplitude modulation.

23 Claims, 27 Drawing Sheets

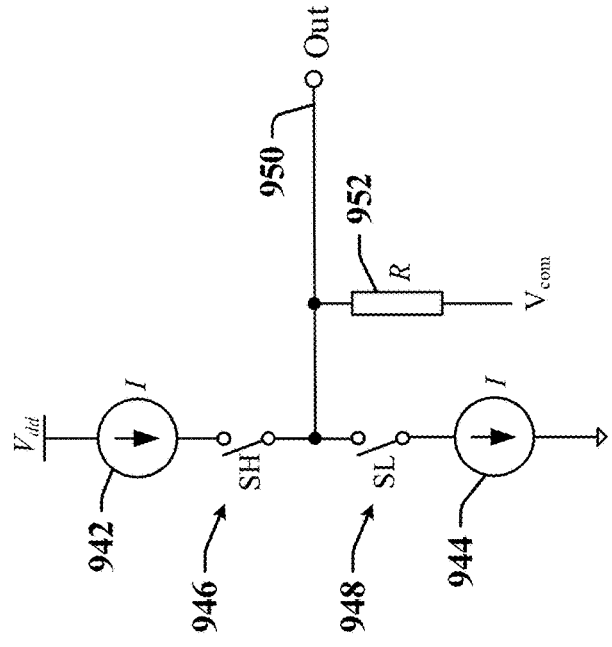
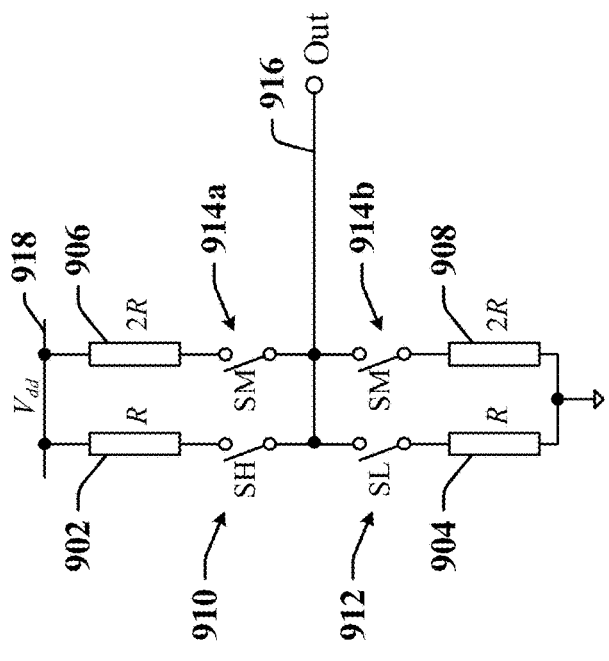
FIG. 9

3-Phase + PAM-4 Symbols

| Wire / Symbol | A (1112) | B (1114) | C (1116) | Sum A+B+C |
|---|---|---|---|---|
| S1  | 3I  | 0   | -3I | 0 |
| S2  | -3I | 0   | 3I  | 0 |
| S3  | 0   | 3I  | -3I | 0 |
| S4  | 0   | -3I | 3I  | 0 |
| S5  | 3I  | -3I | 0   | 0 |
| S6  | -3I | 3I  | 0   | 0 |
| S7  | 3I  | -1  | -2I | 0 |
| S8  | 3I  | -2I | -1  | 0 |
| S9  | -1  | 3I  | -2I | 0 |
| S10 | -2I | 3I  | -1  | 0 |
| S11 | -1  | -2I | 3I  | 0 |
| S12 | -2I | -1  | 3I  | 0 |
| S13 | -3I | 1   | 2I  | 0 |
| S14 | -3I | 2I  | 1   | 0 |
| S15 | 1   | -3I | 2I  | 0 |
| S16 | 2I  | -3I | 1   | 0 |
| S17 | 1   | 2I  | -3I | 0 |
| S18 | 2I  | 1   | -3I | 0 |

Group I (1402): S1–S6
Group II (1404): S7–S18

3-Phase + PAM-3 Symbols

| Symbol \ Wire | A (1112) | B (1114) | C (1116) | Sum A+B+C |
|---|---|---|---|---|
| S1 | 2I | 0 | -2I | 0 |
| S2 | -2I | 0 | 2I | 0 |
| S3 | 0 | 2I | -2I | 0 |
| S4 | 0 | -2I | 2I | 0 |
| S5 | 2I | -2I | 0 | 0 |
| S6 | -2I | 2I | 0 | 0 |
| S7 | -I | -I | -I | 0 |
| S8 | -I | I | I | 0 |
| S9 | I | -2I | -I | 0 |
| S10 | I | I | I | 0 |
| S11 | -I | -I | -2I | 0 |
| S12 | -I | -I | 2I | 0 |

Group I (1702): S1–S6
Group II (1704): S7–S12

1700

3-Phase + PAM-8 Symbols

1800

| Wire / Symbol | A (1112) | B (1114) | C (1116) | Sum A+B+C |
|---|---|---|---|---|
| S1 | 7I | -7I | 0 | 0 |
| S2 | -7I | 7I | 0 | 0 |
| S3 | 7I | 0 | -7I | 0 |
| S4 | -7I | 0 | 7I | 0 |
| S5 | 0 | 7I | -7I | 0 |
| S6 | 0 | -7I | 7I | 0 |
| S7 | 7I | -6I | -I | 0 |
| S8 | 7I | -I | -6I | 0 |
| S9 | -6I | 7I | -I | 0 |
| S10 | -I | 7I | -6I | 0 |
| S11 | -6I | -I | 7I | 0 |
| S12 | -I | -6I | 7I | 0 |
| S13 | -7I | 6I | I | 0 |
| S14 | -7I | I | 6I | 0 |
| S15 | 6I | -7I | I | 0 |
| S16 | I | -7I | 6I | 0 |
| S17 | 6I | I | -7I | 0 |
| S18 | I | 6I | -7I | 0 |
| S19 | 7I | -5I | -2I | 0 |
| S20 | 7I | -2I | -5I | 0 |
| S21 | -5I | 7I | -2I | 0 |
| S22 | -2I | 7I | -5I | 0 |
| S23 | -5I | -2I | 7I | 0 |
| S24 | -2I | -5I | 7I | 0 |
| S25 | -7I | 5I | 2I | 0 |
| S26 | -7I | 2I | 5I | 0 |
| S27 | 5I | -7I | 2I | 0 |
| S28 | 2I | -7I | 5I | 0 |
| S29 | 5I | 2I | -7I | 0 |
| S30 | 2I | 5I | -7I | 0 |
| S31 | 7I | -4I | -3I | 0 |
| S32 | 7I | -3I | -4I | 0 |
| S33 | -4I | 7I | -3I | 0 |
| S34 | -3I | 7I | -4I | 0 |
| S35 | -4I | -3I | 7I | 0 |
| S36 | -3I | -4I | 7I | 0 |
| S37 | -7I | 4I | 3I | 0 |
| S38 | -7I | 3I | 4I | 0 |
| S39 | 4I | -7I | 3I | 0 |
| S40 | 3I | -7I | 4I | 0 |
| S41 | 4I | 3I | -7I | 0 |
| S42 | 3I | 4I | -7I | 0 |

Group I (1802): S1–S6
Group II (1804): S7–S42

3-Phase + PAM-8 – Difference Signals

| Diff / Symbol | A-B (1124) | B-C (1126) | C-A (1128) |
|---|---|---|---|
| S1 | $14V_{State}$ | $-7V_{State}$ | $-7V_{State}$ |
| S2 | $-14V_{State}$ | $7V_{State}$ | $7V_{State}$ |
| S3 | $7V_{State}$ | $7V_{State}$ | $-14V_{State}$ |
| S4 | $-7V_{State}$ | $-7V_{State}$ | $14V_{State}$ |
| S5 | $-7V_{State}$ | $14V_{State}$ | $-7V_{State}$ |
| S6 | $7V_{State}$ | $-14V_{State}$ | $7V_{State}$ |
| S7 | $13V_{State}$ | $-5V_{State}$ | $-8V_{State}$ |
| S8 | $8V_{State}$ | $-7V_{State}$ | $-13V_{State}$ |
| S9 | $-13V_{State}$ | $8V_{State}$ | $5V_{State}$ |
| S10 | $-8V_{State}$ | $13V_{State}$ | $-5V_{State}$ |
| S11 | $-5V_{State}$ | $-8V_{State}$ | $13V_{State}$ |
| S12 | $5V_{State}$ | $-13V_{State}$ | $8V_{State}$ |
| S13 | $-13V_{State}$ | $5V_{State}$ | $8V_{State}$ |
| S14 | $-8V_{State}$ | $-5V_{State}$ | $13V_{State}$ |
| S15 | $13V_{State}$ | $-8V_{State}$ | $-5V_{State}$ |
| S16 | $8V_{State}$ | $-13V_{State}$ | $5V_{State}$ |
| S17 | $5V_{State}$ | $8V_{State}$ | $-13V_{State}$ |
| S18 | $-5V_{State}$ | $13V_{State}$ | $-8V_{State}$ |
| S19 | $12V_{State}$ | $-3V_{State}$ | $-9V_{State}$ |
| S20 | $9V_{State}$ | $3V_{State}$ | $-12V_{State}$ |
| S21 | $-12V_{State}$ | $9V_{State}$ | $3V_{State}$ |
| S22 | $-9V_{State}$ | $12V_{State}$ | $-3V_{State}$ |
| S23 | $-3V_{State}$ | $-9V_{State}$ | $12V_{State}$ |
| S24 | $3V_{State}$ | $-12V_{State}$ | $9V_{State}$ |
| S25 | $-12V_{State}$ | $3V_{State}$ | $9V_{State}$ |
| S26 | $-9V_{State}$ | $-3V_{State}$ | $12V_{State}$ |
| S27 | $12V_{State}$ | $-9V_{State}$ | $-3V_{State}$ |
| S28 | $9V_{State}$ | $-12V_{State}$ | $3V_{State}$ |
| S29 | $3V_{State}$ | $9V_{State}$ | $-12V_{State}$ |
| S30 | $-3V_{State}$ | $12V_{State}$ | $-9V_{State}$ |
| S31 | $11V_{State}$ | $-V_{State}$ | $-10V_{State}$ |
| S32 | $10V_{State}$ | $V_{State}$ | $-11V_{State}$ |
| S33 | $-11V_{State}$ | $10V_{State}$ | $V_{State}$ |
| S34 | $-10V_{State}$ | $11V_{State}$ | $-V_{State}$ |
| S35 | $-V_{State}$ | $-10V_{State}$ | $11V_{State}$ |
| S36 | $V_{State}$ | $-11V_{State}$ | $10V_{State}$ |
| S37 | $-11V_{State}$ | $V_{State}$ | $10V_{State}$ |
| S38 | $-10V_{State}$ | $-V_{State}$ | $11V_{State}$ |
| S39 | $11V_{State}$ | $-10V_{State}$ | $-V_{State}$ |
| S40 | $10V_{State}$ | $-11V_{State}$ | $V_{State}$ |
| S41 | $V_{State}$ | $10V_{State}$ | $-11V_{State}$ |
| S42 | $-V_{State}$ | $11V_{State}$ | $-10V_{State}$ |

*FIG. 19*

| | SH1 | SH2 | SH3 | SL1 | SL2 | SL3 | Notes |
|---|---|---|---|---|---|---|---|
| State-7 | 0 | 1 | 1 | 1 | 0 | 0 | 3I |
| State-6 | 1 | 0 | 1 | 0 | 1 | 0 | 2I |
| State-5 | 0 | 0 | 1 | 1 | 0 | 0 | I |
| State-4 | 1 | 1 | 0 | 0 | 0 | 0 | 0 |
| State-3 | 0 | 1 | 0 | 1 | 0 | 0 | −I |
| State-2 | 1 | 0 | 0 | 0 | 1 | 0 | −2I |
| State-1 | 0 | 0 | 0 | 0 | 1 | 1 | −3I |

FIG. 22

DRIVER ARCHITECTURE FOR MULTIPHASE AND AMPLITUDE ENCODING TRANSMITTERS

PRIORITY CLAIM

This application claims priority to and the benefit of U.S. Provisional Patent Application Ser. No. 62/888,995 filed in the U.S. Patent Office on Aug. 19, 2019, the entire content of this application being incorporated herein by reference as if fully set forth below in its entirety and for all applicable purposes.

TECHNICAL FIELD

The present disclosure relates generally to high-speed data communication interfaces, and more particularly, to improving data throughput over a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance.

A multiphase three-wire (C-PHY) interface defined by the MIPI Alliance uses a trio of conductors to transmit information between devices. Each of the three wires may be in one of three signaling states during transmission of a symbol over the C-PHY interface. Clock information is encoded in a sequence of symbols transmitted on the C-PHY interface and a receiver generates a clock signal from transitions between consecutive symbols. The maximum speed of the C-PHY interface and the ability of a clock and data recovery (CDR) circuit to recover clock information may be limited by the maximum time variation related to transitions of signals transmitted on the different wires of the communication link, which can limit the data throughput provided by the C-PHY interface as demand for increased data throughput continue to increase.

SUMMARY

Certain embodiments disclosed herein provide systems, methods and apparatus that enable improved communication on a multi-wire and/or multiphase communication link through improved encoding techniques and protocol. In some embodiments, data throughput is improved by increasing the number of bits encoded per symbol transition using a combination of a combination of 3-phase encoding and pulse amplitude modulation (PAM) to encode the binary data. The communication link may be deployed in apparatus such as a mobile terminal having multiple Integrated Circuit (IC) devices.

In various aspects of the disclosure, a data communication apparatus has a plurality of line drivers configured to couple the apparatus to a 3-wire link, and a data encoder configured to encode at least 3 bits of binary data in each transition between two symbols that are consecutively transmitted by the plurality of line drivers over the S-wire link such that each pair of consecutively-transmitted symbols includes two different symbols. Each symbol defines signaling states of the 3-wire link during an associated symbol transmission interval such that each wire of the 3-wire link is in a different signaling state from the other wires of the 3-wire link during the associated symbol transmission interval.

In various aspects of the disclosure, a method for data communication includes transmitting a plurality of symbols over a 3-wire link, and encoding at least 3 bits of binary data in each transition between two symbols that are consecutively transmitted over the 3-wire link, where each pair of consecutively-transmitted symbols includes two different symbols. Each symbol defines signaling states of the 3-wire link during an associated symbol transmission interval such that each wire of the 3-wire link is in a different signaling state from the other wires of the 3-wire link during the associated symbol transmission interval.

In certain aspects, a non-transitory processor-readable medium storing computer-executable code is disclosed. The processor-readable medium maintains data and instructions configured to cause a computer to transmit a plurality of symbols over a 3-wire link, and encode at least 3 bits of binary data in each transition between two symbols that are consecutively transmitted over the 3-wire link. Each pair of consecutively-transmitted symbols may include two different symbols where each symbol defines signaling states of the 3-wire link during an associated symbol transmission interval such that each wire of the 3-wire link is in a different signaling state from the other wires of the 3-wire link during the associated symbol transmission interval.

In various aspects of the disclosure, a data communication apparatus includes means for transmitting a plurality of symbols over a 3-wire link, and means for encoding at least 3 bits of binary data in each transition between two symbols that are consecutively transmitted over the 3-wire link. Each pair of consecutively-transmitted symbols may include two different symbols. Each symbol may define signaling states of the 3-wire link during an associated symbol transmission interval such that each wire of the 3-wire link is in a different signaling state from the other wires of the 3-wire link during the associated symbol transmission interval.

In certain aspects, at least one symbol transmitted over the 3-wire link defines non-zero current flows for each wire of the 3-wire link and where a sum of the non-zero current flows is zero. The signaling states of the wires of the 3-wire link may include seven voltage levels, and at least one symbol transmitted over the 3-wire link defines a voltage level for each wire of the 3-wire link that is above or below a middle voltage level of the seven voltage levels.

In certain aspects, the data encoder is further configured to use a combination of 3-phase encoding and PAM to encode the binary data. A first symbol may be transmitted over the 3-wire link 2420. In one example, the data encoder selects the first symbol from a set of 12 symbols when the data encoder is configured for a first encoding scheme. In another example, the data encoder selects the first symbol from a set of 18 symbols when the data encoder is configured for a second encoding scheme In another example, the data encoder selects the first symbol from a set of 42 symbols when the data encoder is configured for a first encoding scheme. The apparatus 2700 may transmit a second symbol over the 3-wire link 2420. The data encoder may be further configured to select the second symbol from a set of available symbols that excludes the first symbol.

In certain aspects, the apparatus includes a wire state encoder configured to receive a sequence of symbols from the data encoder, and provide control signals to the plurality of line drivers that cause each of the plurality of line drivers to drive one wire of the 3-wire link to a signaling state defined by a first symbol in the sequence of symbols during a symbol transmission interval provided for first symbol.

In certain aspects, the plurality of line drivers may include three voltage drivers, and the wire state encoder may be further configured to configure a plurality of switches in each voltage driver such that each wire of the 3-wire link is coupled to one or more voltage levels through two or more resistors in one of the three voltage drivers during each symbol transmission interval. The plurality of switches in each voltage driver may be configured in each symbol transmission interval such that a combination of resistors coupled to a corresponding wire of the 3-wire link matches a characteristic impedance of the corresponding wire of the 3-wire link.

In certain aspects, the plurality of line drivers includes three current drivers, and the wire state encoder is further configured to configure a plurality of switches that causes each of the three current drivers to provide a current in a corresponding wire of the S-wire link that has a magnitude defined by a symbol being transmitted in a current symbol transmission interval. The apparatus may include resistors coupled to the 3-wire link, each resistor matching a characteristic impedance of the 3-wire link.

BRIEF DESCRIPTION OF THE DRAWINGS

FIG. 9 illustrates examples of C-PHY driver circuits that may be adapted in accordance with certain aspects disclosed herein.

FIGS. 12-14 illustrate a first example of an encoding scheme in which 3-phase encoding is combined with PAM-4 modulation in accordance with certain aspects of this disclosure.

FIGS. 15-17 illustrate a second example of an encoding scheme in which 3-phase encoding is combined with PAM-3 modulation in accordance with certain aspects of this disclosure.

FIGS. 18 and 19 illustrate a third example of an encoding scheme that combines 3-phase encoding with PAM-8 modulation in accordance with certain aspects of this disclosure.

FIG. 22 illustrates a voltage-mode driver configured or adapted in accordance with certain aspects of this disclosure.

DETAILED DESCRIPTION

Figure 1:
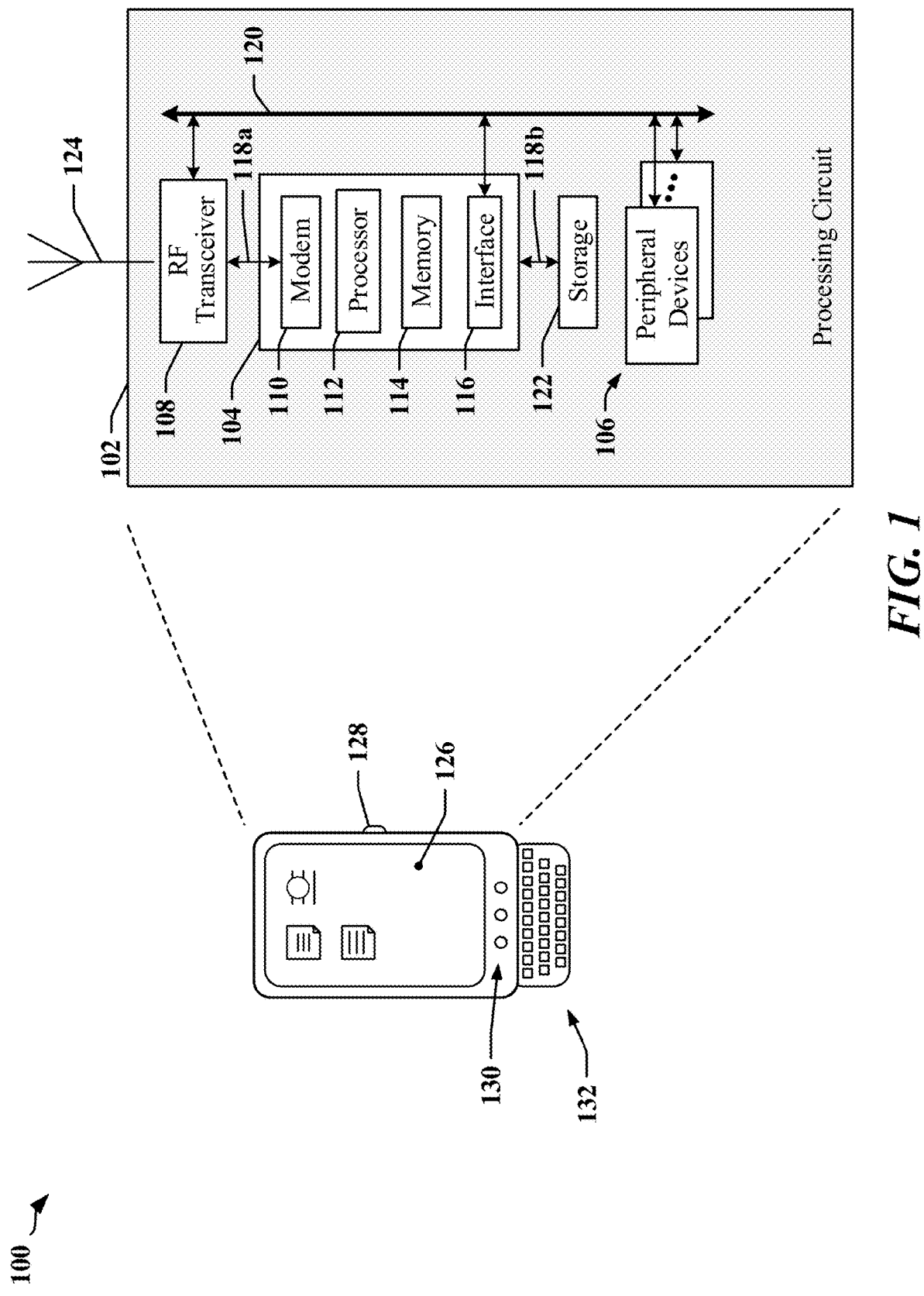
FIG. 1 depicts an apparatus employing a data link between IC devices that is selectively operated according to one of a plurality of available standards or protocols, which may include a C-PHY protocol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various processor-readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to improving a C-PHY interface specified by the MIPI Alliance, which is often deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a drone, a sensor, a vending machine, or any other similarly functioning device.

Certain aspects disclosed herein enable devices to communicate at higher data rates over a three-wire communication link than possible using conventional C-PHY symbol rates. In various aspects of the disclosure, a data communication apparatus has a plurality of line drivers configured to couple the apparatus to a 3-wire link, and a data encoder configured to encode at least 3 bits of binary data in each transition between two symbols that are consecutively transmitted by the plurality of line drivers over the 3-wire link such that each pair of consecutively-transmitted symbols includes two different symbols. Each symbol defines signaling states of the 3-wire link during an associated symbol transmission interval such that each wire of the 3-wire link is in a different signaling state from the other wires of the 3-wire link during the associated symbol transmission interval. Data may be encoded using a combination of 3-phase and PAM. The apparatus may include a wire state encoder configured to receive a sequence of symbols from the data encoder, and provide control signals to the plurality of line drivers. The control signals cause each of the plurality of line drivers to drive one wire of the 3-wire link to a signaling state defined by each symbol during a symbol transmission interval provided for each symbol in the sequence of symbols. The wire state encoder may be configured or configurable for PAM-2, PAM-3, PAM-4, PAM-8 and other PAM implementations.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or as a trio of wires. The three-phase signal is transmitted in a different phase on each wire of the trio. Each three-wire trio provides a lane on a communication link. A symbol interval may be defined as the interval of time in which a single symbol controls the signaling state of a trio. In each symbol interval, one wire is "undriven" or driven to a mid-level voltage state while the remaining two of the three wires are differentially driven such that one of the two differentially driven wires assumes a first voltage level and the other differentially driven wire assumes to a second voltage level different from the first voltage level. In some implementations, the third wire is undriven or floating such that it assumes a third voltage level that is at or near the mid-level voltage between the first and second voltage levels due to the action of terminations. In some implementations, the third wire is driven toward the mid-level voltage. In one example, the driven voltage levels may be +V and −V with the undriven voltage being 0 V. In another example, the driven voltage levels may be +V and 0 V with the undriven voltage being +V/2. Different symbols are transmitted in each consecutively transmitted pair of symbols, and different pairs of wires may be differentially driven in different symbol intervals.

FIG. 1 depicts an example of apparatus 100 that may employ C-PHY 3-phase protocols to implement one or more communication links. The apparatus 100 may include an SoC, or a processing circuit 102 that has multiple circuits or devices 104, 106 and/or 108, which may be implemented in one or more ASICs. In one example, the apparatus 100 may operate as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
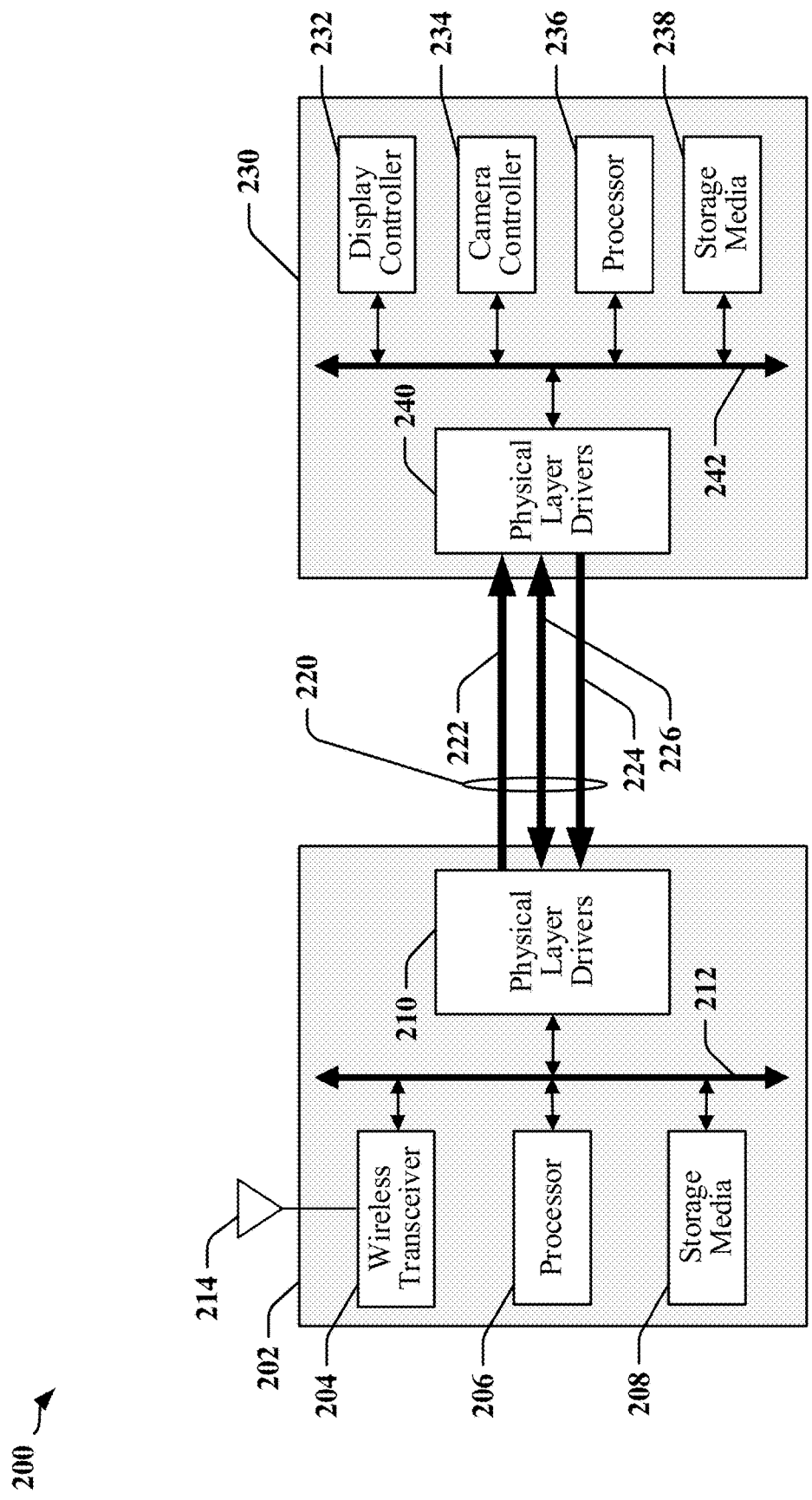
FIG. 2 illustrates a system architecture for an apparatus employing a data link between IC devices that selectively operates according to one of plurality of available standards.

FIG. 2 illustrates certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first channel 222 may be referred to as a forward channel 222 while a second channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor 206, 236 or other processing and/or computing circuit or device. In one example, the first IC device 202 may perform core functions of the apparatus 200, including establishing and maintaining wireless communication through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222. The forward channel 222 and the reverse channel 224 may be capable of transmitting at comparable speeds or at different speeds, where speed may be expressed as data transfer rate and/or clocking rates. The forward and reverse data rates may be substantially the same or may differ by orders of magnitude, depending on the application. In some applications, a single bidirectional channel 226 may support communication between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

The physical layer drivers 210 and 240 can typically encode multiple bits per transition on the communication link 220 when configured for N-phase polarity encoding. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
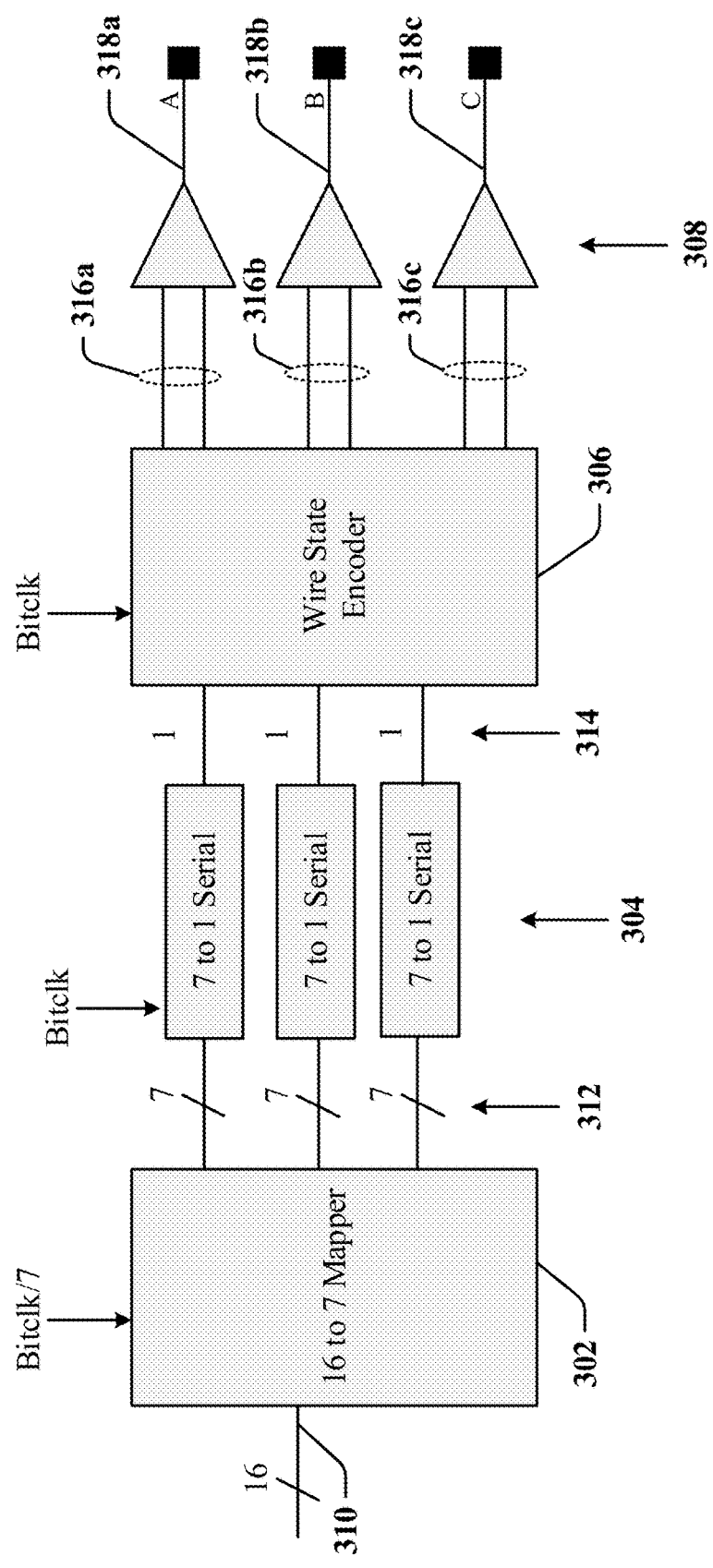
FIG. 3 illustrates a C-PHY 3-phase transmitter.

FIG. 3 is a diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders may be applicable to other configurations of M-wire, N-phase polarity encoders.

Signaling states defined for each of the 3 wires in a 3-wire, 3-phase polarity encoding serial bus may include an undriven or mid-level state, a positively driven state and a negatively driven state. The positively driven state and the negatively driven state may be obtained by providing a voltage differential between two of the signal wires 318a, 318b and/or 318c, and/or by driving a current through two of the signal wires 318a, 318b and/or 318c connected in series such that the current flows in different directions in the two signal wires 318a, 318b and/or 318c. The undriven state may be realized by placing an output of a driver of a signal wire 318a, 318b or 318c in a high-impedance mode. In some instances, a mid-level state may be obtained on a signal wire 318a, 318b or 318c by passively or actively causing a signal wire 318a, 318b or 318c to attain a voltage level that lies substantially halfway between positive and negative voltage levels provided on driven signal wires 318a, 318b and/or 318c. Typically, there is no significant current flow through an undriven or mid-level signal wire 318a, 318b or 318c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 318a, 318b and 318c. The drivers 308 may be implemented as unit-level current-mode or voltage-mode drivers. In one example, each driver 308 may receive sets of two or more of signals 316a, 316b and 316c that determine the output state of corresponding signal wires 318a, 318b and 318c. In one example, the sets of two signals 316a, 316b and 316c may include a pull-up signal (PU signal) and a pull-down signal (PD signal) that, when high, activate pull-up and pull down circuits that drive the signal wires 318a, 318b and 318c toward a higher level or lower level voltage, respectively. In this example, when both the PU signal and the PD signal are low, the signal wires 318a, 318b and 318c may be terminated to a mid-level voltage.

For each transmitted symbol interval in an M-wire, N-phase polarity encoding scheme, at least one signal wire 318a, 318b or 318c is in the midlevel/undriven (0) voltage or current state, while the number of positively driven (+1 voltage or current state) signal wires 318a, 318b or 318c is equal to the number of negatively driven (−1 voltage or current state) signal wires 318a, 318b or 318c, such that the sum of current flowing to the receiver is always zero. For each symbol, the signaling state of at least one signal wire 318a, 318b or 318c is changed from the wire state transmitted in the preceding transmission interval.

In operation, a mapper 302 may receive and map 16-bit data 310 to 7 symbols 312. In the 3-wire example, each of the 7 symbols 312 defines the states of the signal wires 318a, 318b and 318c for one symbol interval. The 7 symbols 312 may be serialized using parallel-to-serial converters 304 that provide a timed sequence of symbols 314 for each signal wire 318a, 318b and 318c. The sequence of symbols 314 is typically timed using a transmission clock. A 3-wire, 3-phase encoder 306 receives the sequence of 7 symbols 314 produced by the mapper one symbol at a time and computes the state of each signal wire 318a, 318b and 318c for each symbol interval. The 3-wire, 3-phase encoder 306 selects the states of the signal wires 318a, 318b and 318c based on the current input symbol 314 and the previous states of signal wires 318a, 318b and 318c.

The use of M-wire, N-phase encoding permits a number of bits to be encoded in a plurality of symbols where the bits per symbol is not an integer. In the example of a 3-wire communication link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
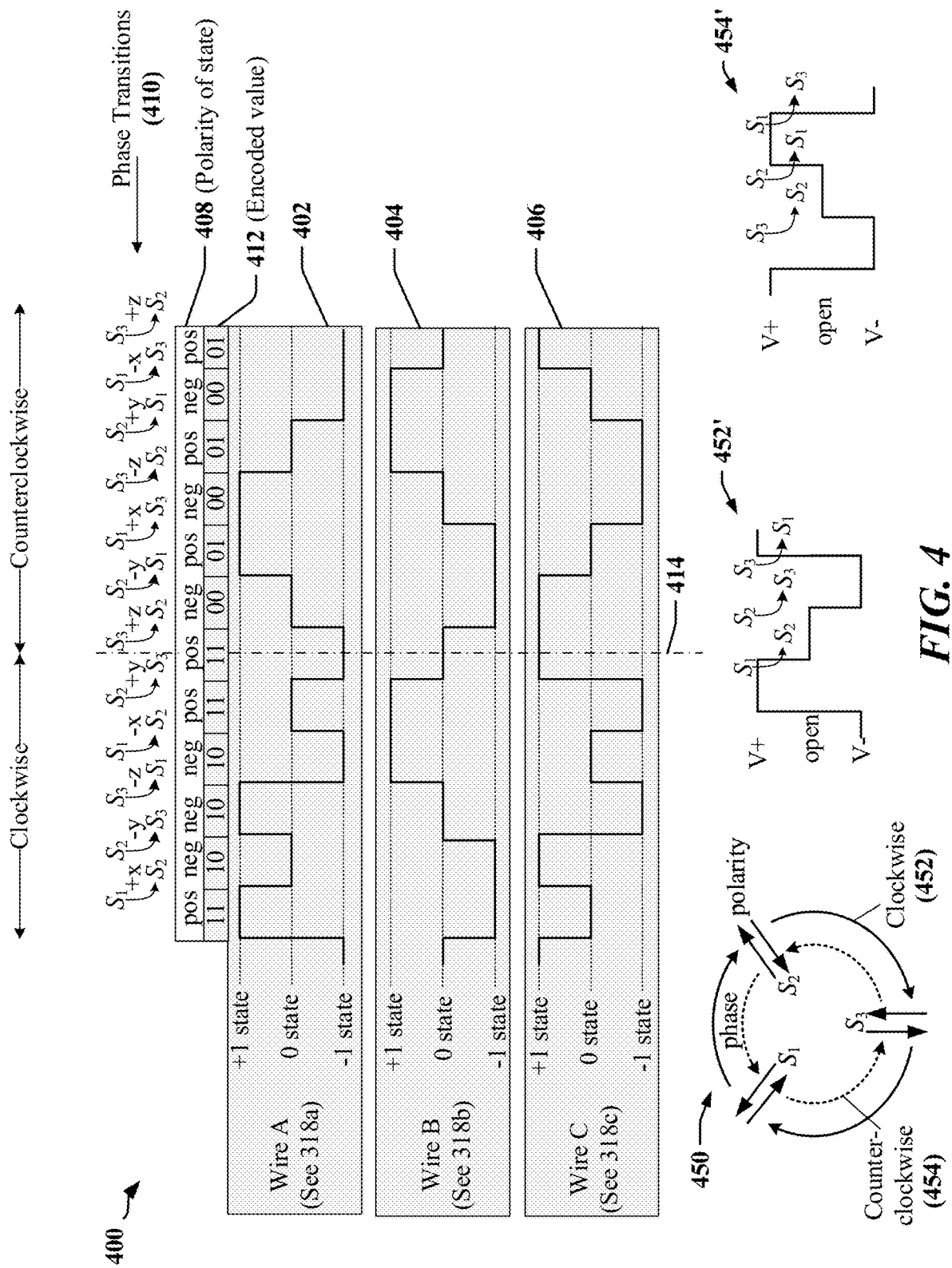
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 452' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$ from $S_3$ to $S_2$ and from $S_2$ to $S_1$. The three signal wires 318a, 318b and 318c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 318a, 318b and 318c is in a different signaling states than the other wires. When more than 3 signal wires 318a, 318b and 318c are used in a 3-phase encoding system, two or more signal wires 318a, 318b and/or 318c can be in the same signaling state at each signaling interval, although each state is present on at least one signal wire 318a, 318b and/or 318c in every signaling interval.

Information may be encoded in the direction of rotation at each phase transition 410, and the 3-phase signal may change direction for each signaling state. Direction of rotation may be determined by considering which signal wires 318a, 318b and/or 318c are in the '0' state before and after a phase transition, because the undriven signal wire 318a, 318b and/or 318c changes at every signaling state in a rotating three-phase signal, regardless of the direction of rotation.

The encoding scheme may also encode information in the polarity 408 of the two signal wires 318a, 318b and/or 318c that are actively driven. At any time in a 3-wire implementation, exactly two of the signal wires 318a, 318b, 318c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 318a, 318b and 318c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

Figure 5:
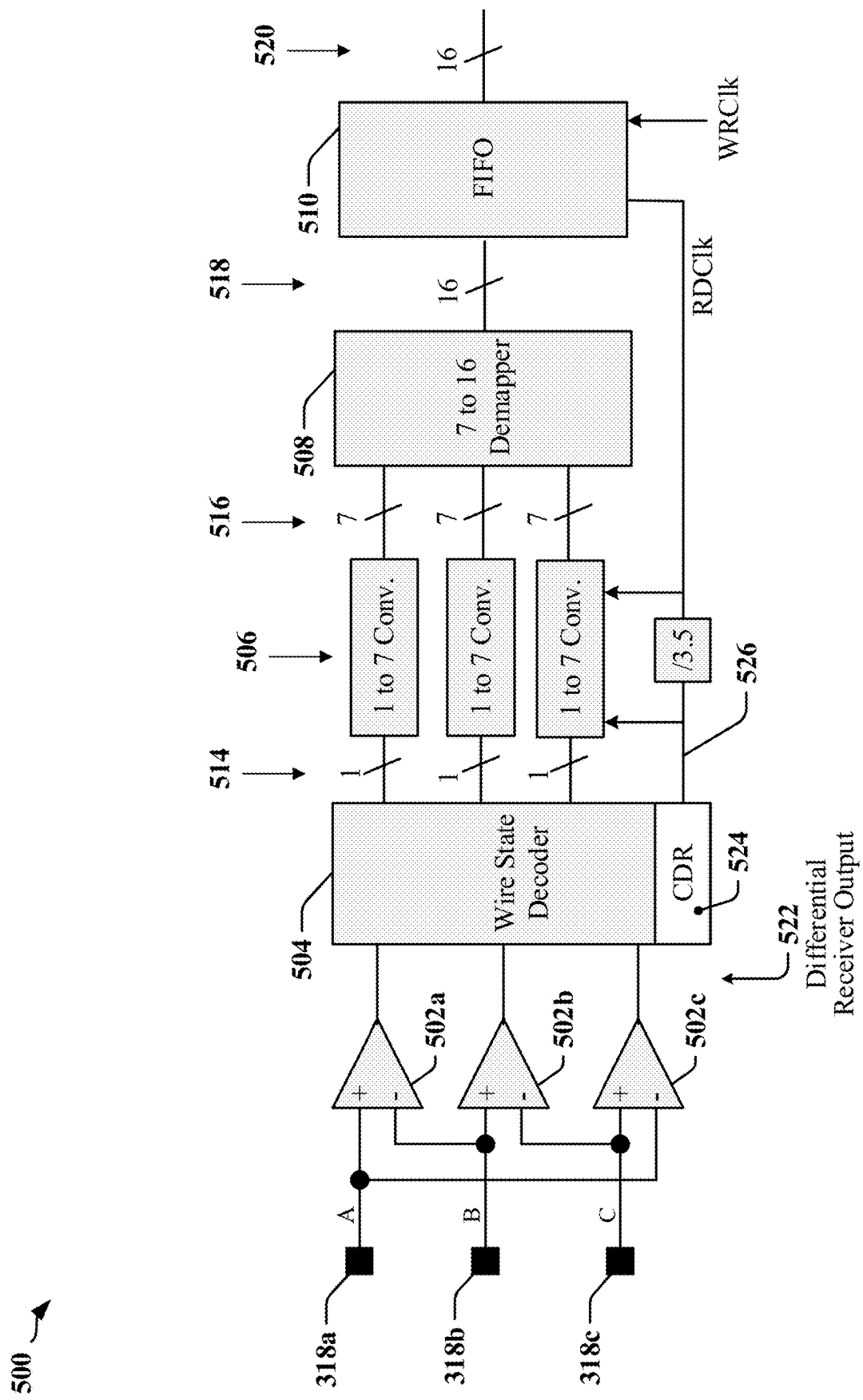
FIG. 5 illustrates a C-PHY 3-phase receiver.

FIG. 5 is a diagram illustrating certain aspects of a 3-wire, 3-phase decoder 500. Differential receivers 502a, 502b, 502c and a wire state decoder 504 are configured to provide a digital representation of the state of the three transmission lines (e.g., the signal wires 318a, 318b and 318c illustrated in FIG. 3), with respect to one another, and to detect changes in the state of the three transmission lines compared to the state transmitted in the previous symbol period. Seven consecutive states are assembled by the serial-to-parallel convertors 506 to obtain a set of 7 symbols to be processed by the demapper 508. The demapper 508 produces 16 bits of data 518 that may be buffered in a first-in-first-out (FIFO) register 510 that provides an output 520 of the decoder 500.

The wire state decoder 504 may extract a sequence of symbols 514 from difference signals 522 derived from phase encoded signals received by the differential receivers 502a, 502b, 502c from the signal wires 318a, 318b and 318c. The symbols 514 are encoded as a combination of phase rotation and polarity as disclosed herein. The wire state decoder may include a CDR circuit 524 that extracts a clock 526 that can be used to reliably capture wire states from the signal wires 318a, 318b and 318c. A transition occurs on least one of the signal wires 318a, 318b and 318c at each symbol boundary and the CDR circuit 524 may be configured to generate the clock 526 based on the occurrence of a transition or multiple transitions. An edge of the clock may be delayed to allow time for all signal wires 318a, 318b and 318c to have stabilized and to thereby ensure that the current wire state is captured for decoding purposes.

Figure 6:
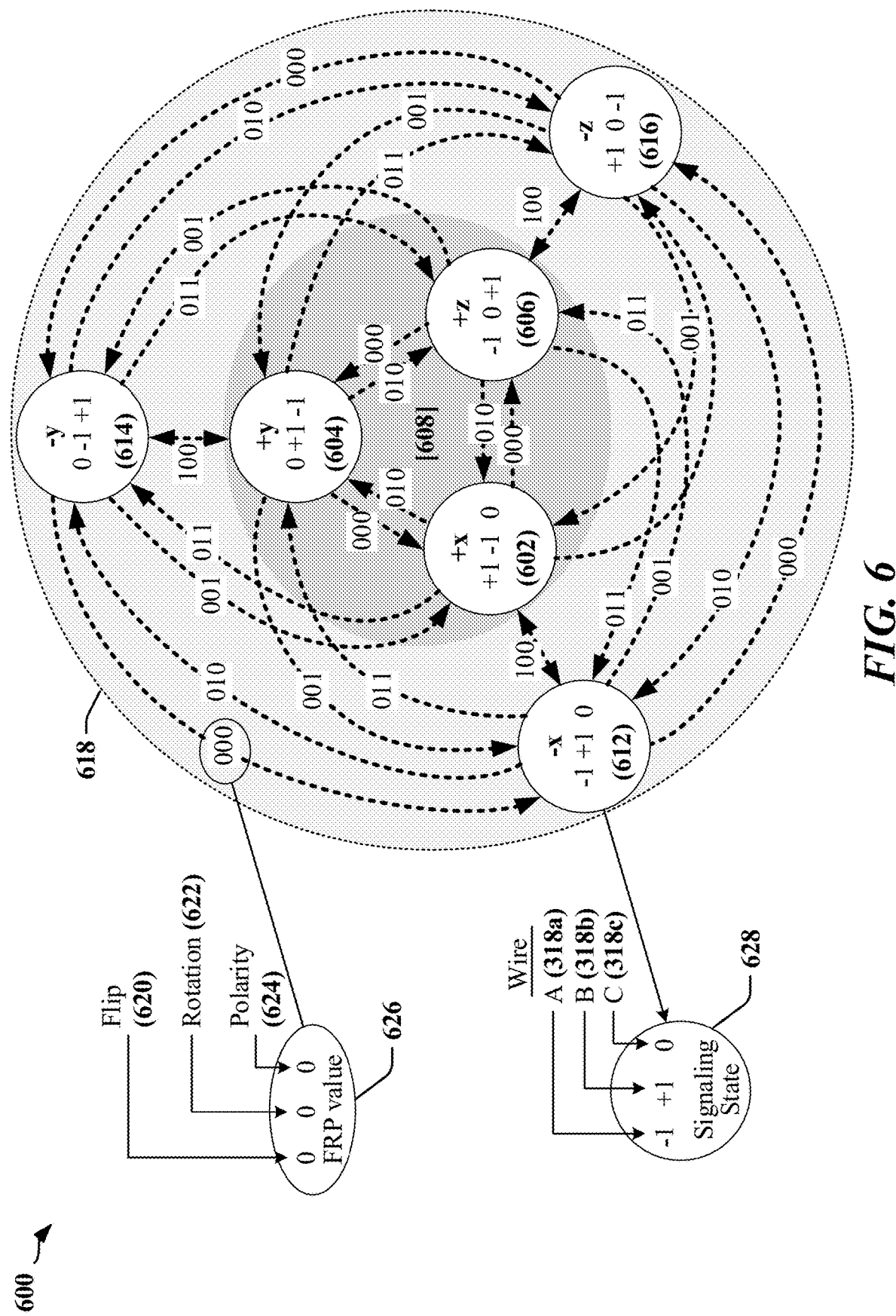
FIG. 6 is a state diagram illustrating potential state transitions in a C-PHY 3-phase encoded interface.

FIG. 6 is state diagram 600 illustrating the possible signaling states 602, 604, 606, 612, 614, 616 of the three wires, with the possible transitions illustrated from each state. In the example of a 3-wire, 3-phase communication link, 6 states and 30 state transitions are available. The possible states 602, 604, 606, 612, 614 and 616 in the state diagram 600 include and expand on the states shown in the circular state diagram 450 of FIG. 4. As shown in the exemplar of a state element 628, each state 602, 604, 606, 612, 614 and 616 in the state diagram 600 defines voltage signaling state of the signal wires 318a, 318b, 318c, which are labeled A, B and C respectively. For example, in state 602 (+x) wire A=+1, wire B=−1 and wire C=0, yielding output of differential receiver 602a (A−B)=+2, differential receiver 602b (B−C)=−1 and differential receiver 602c (C−A)=−1. Transition decisions taken by phase change detect circuits in a receiver are based on 5 possible levels produced by the differential receivers 502a, 502b, 502c, which include −2, −1, 0, +1 and +2 voltage states.

The transitions in the state diagram 600 can be represented by a Flip, Rotate, Polarity symbol (e.g., the FRP symbol 626) that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity states 602, 604, 606 and an outer circle 618 that encompasses the negative polarity states 612, 614, 616.

Figure 7:
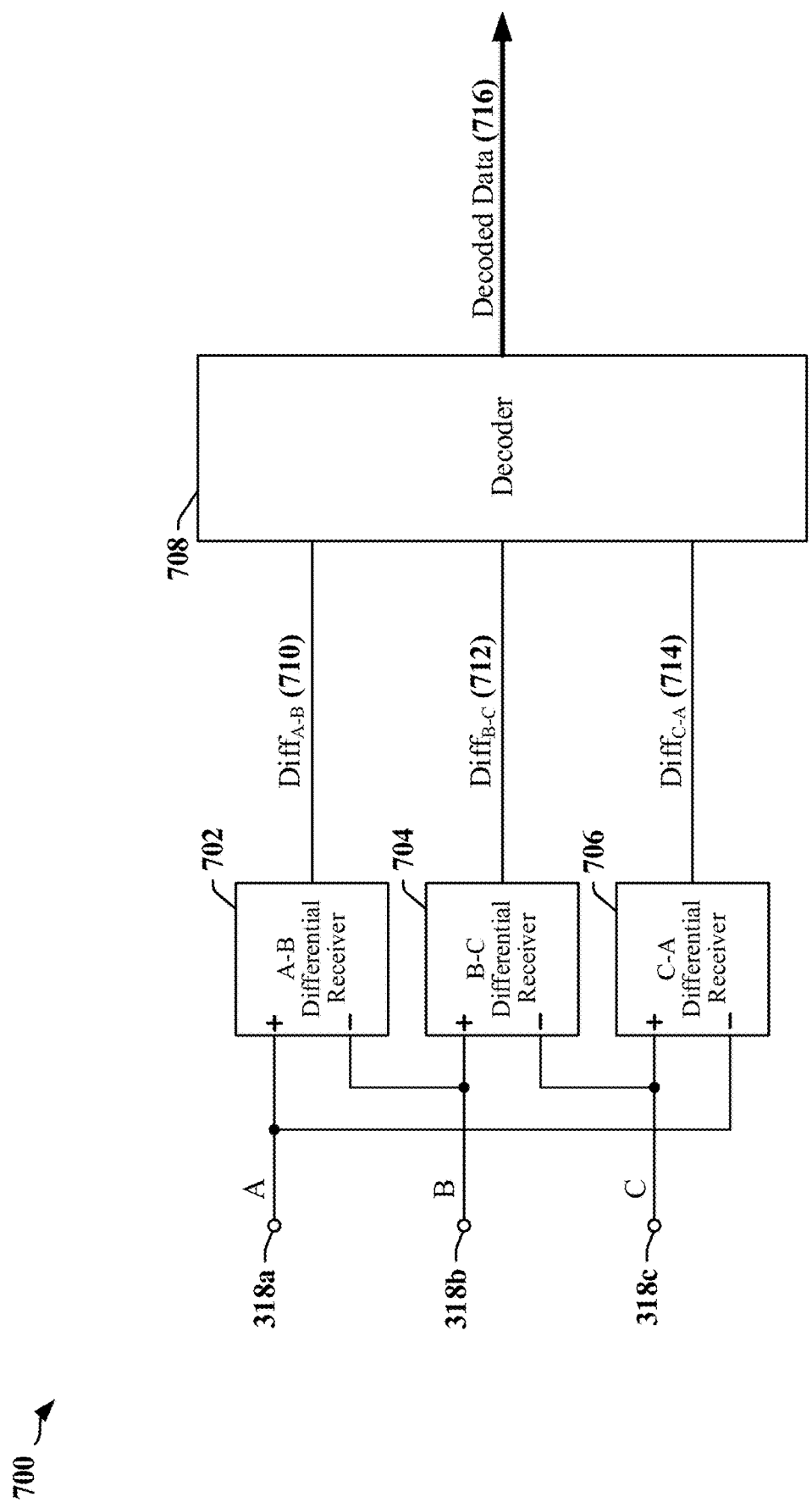
FIG. 7 illustrates a bus interface circuit provided in a receiver of a C-PHY receiver that may be adapted in accordance with certain aspects disclosed herein.
Figure 8:
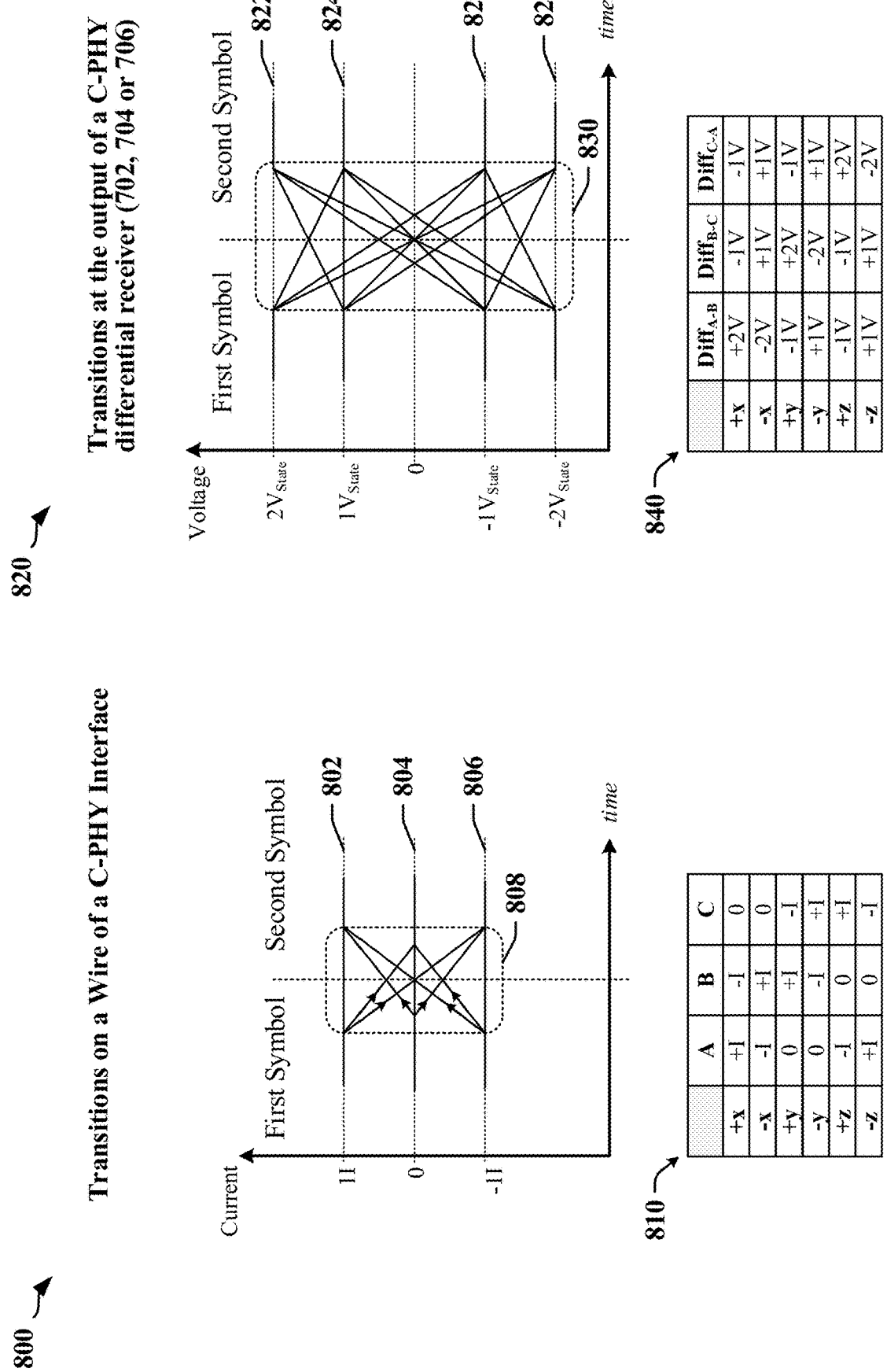
FIG. 8 illustrates signaling associated with the bus interface circuit of FIG. 7.

FIGS. 7 and 8 illustrate certain aspects of the operation of a C-PHY interface, which may be adapted in accordance with certain aspects disclosed herein. FIG. 7 illustrates a bus interface circuit 700 provided in a receiver in a C-PHY 3-phase interface. Each differential receiver 702, 704 and 706 is configured to observe the voltage difference present at its inputs, and generates a one-bit digital difference signal 710, 712, 714 that corresponds to the band where the differential voltage exists. Each differential receiver 702, 704, 706 receives two of the three signal wires 318a, 318b, 318c as inputs. In the example depicted, a first differential receiver 702 compares the states of signal wires 318a and 318b, a second differential receiver 704 compares the states of signal wires 318b and 318c and a third differential receiver 706 compares the states of signal wires 318a and 318c. Each differential receiver 702, 704, 706 outputs a difference signal 710, 712, 714 that indicates a subtractive difference between respective input pairs of signal wires 318a, 318b and/or 318c in the trio. The difference signals 710, 712, 714 are provided to a decoder that, for example, may be configured to operate in accordance with the state diagram 600 of FIG. 6. In the example of the 3-wire, 3-phase interface corresponding to the state diagram 600 of FIG. 6, the decoder 708 may compare each difference signal 710, 712, 714 to a zero-volt reference to determine a binary value for each bit of a three-bit symbol representing signaling state of the trio. The decoder 708 may generate a sequence of symbols that can be decoded to extract encoded data as the output 716 of the decoder 708.

FIG. 8 illustrates certain aspects of the signaling expected during operation of the bus interface circuit 700. A first timing diagram 800 illustrates the three signaling states 802, 804, 806 defined for each of the three signal wires 318a, 318b, 318c in a C-PHY interface. Each signaling state 802, 804, 806 may be defined in terms of voltage level observed on a signal wire 318a, 318b, 318c or, as illustrated in the first timing diagram 800, in terms of a current flow through the signal wire 318a, 318b, 318c. The amperage of the current in each state is represented as ±I amps or 0 amps. In a first signaling state 802 a current of +I amps flows in a wire of the C-PHY bus, in a second signaling state 804 a current of 0 amps flows in the wire, and in a third signaling state 806 a current of −I amp flows in the wire. The value of I may be determined by application requirements or objectives, and/or device specifications. In one example, the value of I may be selected to produce a voltage level or voltage range at a receiver coupled to the C-PHY bus.

A table 810 is provided as an example of a mapping of symbols to current flow in the three signal wires 318a, 318b, 318c (identified as wires A, B and C). Each of the illustrated set of symbols {+x, −x, +y, −y, +z, −z} may correspond to a state 602, 604, 606, 612, 614 and 616 illustrated in FIG. 6. A transition interval 808 represents the duration of time between consecutive symbols during which transitions between the signaling states 802, 804, 806 can be expected to be completed. Two transitions are shown from each signaling states 802, 804, 806, and certain symbol transition may produce no change in signaling state of one of the three signal wires 318a, 318b, 318c.

A second timing diagram 820 illustrates the four signaling states 822, 824, 826, 828 of the difference signals 710, 712, 714 produced by the differential receivers 702, 704, 706. Each signaling state 822, 824, 826, 828 may define a nominal voltage level or voltage range observed in a difference signal 710, 712, 714. The voltage level of each state may be expressed as a multiple of a unit of voltage ($V_{State}$). A first signaling state 822 is represented by a nominal voltage level of +$2V_{State}$, a second signaling state 824 is represented by a nominal voltage level of +$1V_{State}$, a third signaling state 826 is represented by a nominal voltage level of $-1V_{State}$, and a fourth signaling state 822 is represented by a nominal voltage level of $-2V_{State}$. The nominal value of $V_{State}$ may be determined by application requirements or objectives, and/or device specifications.

The table 840 is provided as an example of a mapping of symbols to signaling state 822, 824, 826, 828 in the three difference signals 710, 712, 714 (identified as $Diff_{A-B}$, $Diff_{B-C}$, $Diff_{C-A}$) generated for the set of symbols {+x, −x, +y, −y, +z, −z} illustrated in FIG. 6. A transition interval 830 represents the duration of time between consecutive symbols during which signaling state 822, 824, 826, 828 can be expected to be uncertain. Three possible transitions are shown from each signaling state 802, 804, 806 to a different signaling state 802, 804, 806. Certain symbol transition may produce no change in the two intermediate signaling states 824, 826.

FIG. 9 illustrates examples of line drivers 900, 940 that may be employed in a C-PHY interface. A voltage-mode line driver 900 employs switches 910, 912, 914a, 914b to select a voltage state for a wire 916 of a C-PHY bus. In one example, the switches 910, 912, 914a, 914b can be controlled by the 3-wire, 3-phase encoder 306 of FIG. 3. The table 920 illustrates combinations of switch states that provide the three signaling states defined for the wire 916 according to C-PHY protocols. A switch 910, 912, 914a, 914b is closed or activated when binary-1 is indicated in the table 920, and a switch 910, 912, 914a, 914b is open or deactivated when binary-0 is indicated in the table 920.

In the illustrated example of a voltage-mode line driver 900, a high signaling state 922 is achieved when the wire 916 is coupled to a high voltage level 918 through a first resistor 902 by closing a first switch 910. A low signaling state 924 is achieved when the wire 916 is coupled to system ground or another low voltage level through a second resistor 904 by closing a second switch 912. The mid-level signaling state 926 is achieved when the wire 916 is coupled to the high voltage level 918 through a third resistor 906 by closing a first mid-level switch 914a while a second mid-level switch 914b is closed and couples the wire 916 to system ground or another low voltage level through a fourth resistor 908. Each of the first and second resistors 902, 904 have a resistance value (R) that matches the characteristic impedance ($Z_O$) associated with the wire 916. The voltage-mode line driver 900 presents an impedance that matches $Z_O$ when only the first switch 910 is closed or only the second switch 912 is closed. Each of the third and fourth resistors 902, 904 have a resistance value (2R) that, when both mid-level switches 914a and 914b are closed, cause the voltage-mode line driver 900 to present an impedance that matches $Z_O$.

A current-mode line driver 940 employs switches 946, 948 that can be operated to select a current corresponding to each of the signaling states defined for a wire 950 of a C-PHY bus. In one example, the switches 946, 948 can be controlled by the 3-wire, 3-phase encoder 306 of FIG. 3. The table 960 illustrates combinations of switch states that provide the three signaling states defined for the wire 950 according to C-PHY protocols. A switch 946, 948 is closed or activated when binary-1 is indicated in the table 960, and a switch 946, 948 is open or deactivated when binary-0 is indicated in the table 960.

In the illustrated example of a current-mode line driver 940, a high signaling state 962 is achieved when the wire 950 is coupled to a first current source 942 by closing a first switch 946, resulting in a current flowing to the wire 950. In some instances, the current-mode line driver 940 has a termination resistor 952 of resistance value (R) that matches the characteristic impedance ($Z_O$) associated with the wire 950. The termination resistor 952 is coupled at one end to a mid-point voltage, and current flow through the termination resistor 952 produces a high voltage state. A low signaling state 964 is achieved when the wire 950 is coupled to a second current source 944 by closing a second switch 948, resulting in a current flowing from the wire 950. When the current flows through the termination resistor 952, a low voltage state is produced on the wire 950. The first current source 942 and the second current source 944 typically produce a current of the same nominal magnitude, and the mid-level signaling state 966 is achieved when both switches 946, 948 are closed causing the currents from the current sources 942 and 944 to cancel, with no current flowing through the wire 950.

Demands for increased data throughput over a C-PHY link can be met to a certain extent by increasing the frequency of a clock used to control transmissions over the C-PHY bus. The ability to increase clock frequency is limited by the transition intervals 808, 830 and by other timing limitations arising from device switching speed, transmission line characteristics, etc.

Certain aspects of this disclosure enable devices to communicate at higher data rates over a three-wire communication link than possible in a conventional C-PHY implementation. The theoretical encoding rate of a 3-wire, 3-phase encoder is $\log_2(6) \cong 2.58$ bits per symbol. In a C-PHY interface, clock information is embedded by prohibiting transmission of the same symbol in consecutive symbol intervals, providing a resultant encoding rate of reduction $\log_2(6-1) \cong 2.32$ bits per symbol. In certain aspects of the disclosure, the number of bits encoded per symbol in a C-PHY interface may be increased beyond the 2.32 bits per symbol using an encoding scheme that combines 3-phase encoding with PAM.

Figure 10:
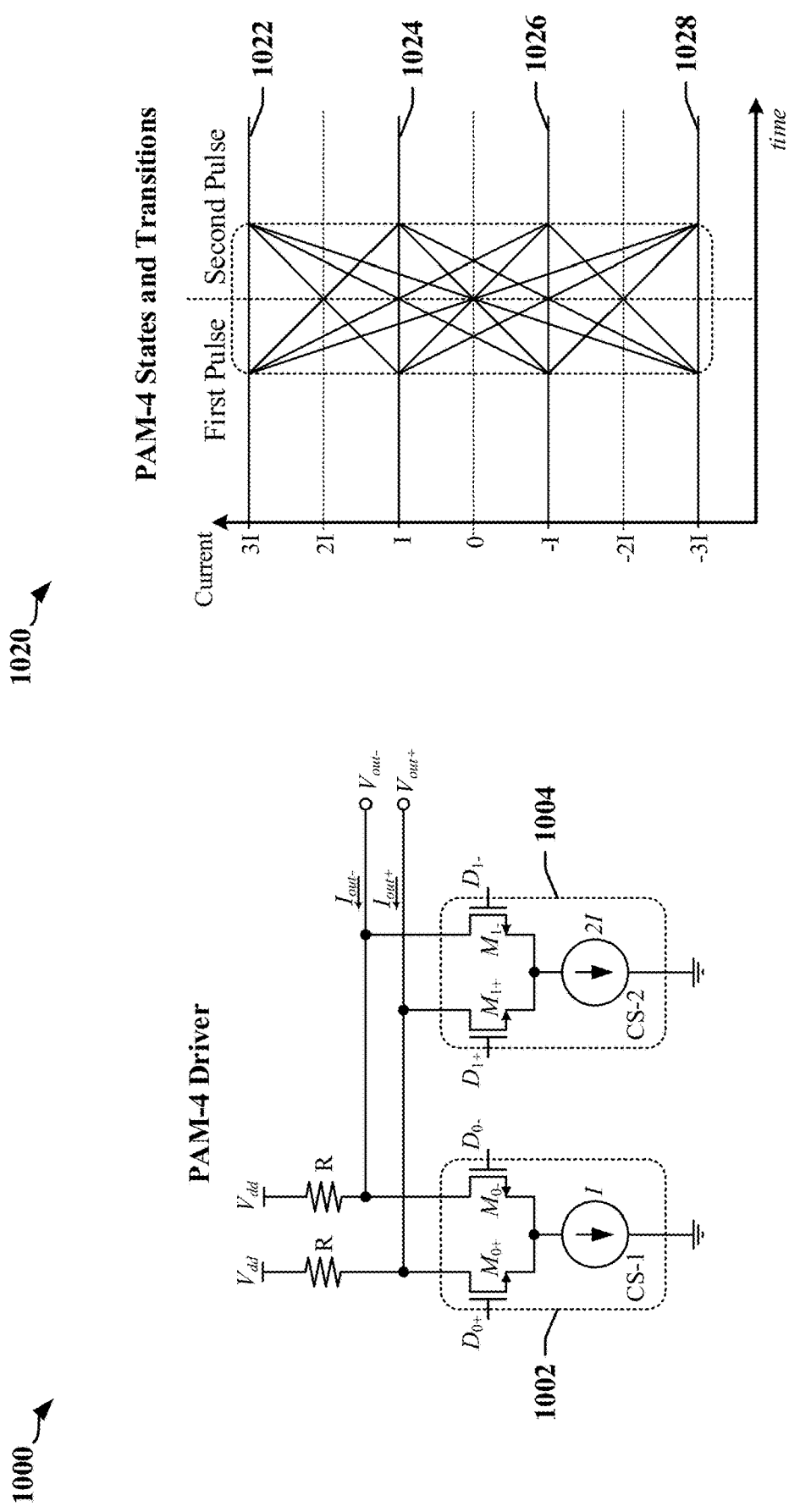
FIG. 10 illustrates an example of a PAM driver that is configured to encode two bits of data using four signaling states.

FIG. 10 illustrates an example of a PAM driver 1000 that is configured to encode two bits of data using four signaling states (PAM-4). In the illustrated example, the PAM driver 1000 includes two current cells 1002, 1004. The first current cell 1002 provides a current of unit amperage (±I) while the second current cell 1004 provides a current of greater amperage (here, ±2I). The currents produced by the first current cell 1002 and the second current cell 1004 are added to provide an output current ($I_{out}$), which produces a voltage level ($V_{out}$) when the PAM driver 1000 is terminated. As illustrated in the timing diagram 1020, four states 1022, 1024, 1026, 1028 are available for encoding. The four states enable $\log_2(4)=2$ bits of data to be encoded per transmitted symbol.

Certain aspects disclosed herein relate to encoding schemes that combine PAM with 3-phase encoding to increase the number of bits that can be encoded in each transition between transmitted symbols. PAM may be used to increase the number of voltage or current levels that can be used to define signaling states for a 3-wire link. Three voltage or current levels are used to define signaling states of a 3-wire link operated in accordance with conventional C-PHY protocols, which effectively use PAM-2 modulation. Certain aspects of this disclosure provide encoding schemes that define symbols that represent or define signaling state of the 3-wire link during a symbol transmission interval when at least 5 voltage or current levels are available for each wire. In one example, PAM-3 modulation provides 5 voltage or current levels per wire of the 3-wire link. In another example, PAM-4 modulation provides 7 voltage or current levels per wire of the 3-wire link. In another example, PAM-8 modulation provides 15 voltage or current levels per wire of the 3-wire link.

In the example of PAM-4 encoded 3-phase signals, data is encoded in transitions between symbols selected from a set of symbols that represent and/or determine the phase and voltage amplitude, or phase and current flow in a symbol transmission interval. The PAM-modulated, 3-phase signal is transmitted in a different phase on each wire of a 3-wire link during each symbol transmission interval. In the example of PAM-4 modulation, 18 symbols may be used for encoding data. In some instances, certain bits of a unit of data may be effectively encoded in transitions between symbols, and/or other bits of the unit of data may be encoded in the PAM-4 voltage levels. In some instances, the unit of data may be used to select a symbol to be transmitted based on the immediately preceding symbol and the unit of data to be encoded in the transition. In some instances, the larger units of data (e.g. bytes or words) may be used to select a sequence of symbols to be transmitted.

Table A below illustrates a sampling of examples of encoding schemes that may be implemented in accordance with certain aspects disclosed herein.

TABLE A

| PAM | States Provided | log$_2$(States) | log$_2$(States-1) |
|---|---|---|---|
| PAM-2 | 6 × (2 − 1) = 6 | 2.58 | 2.32 |
| PAM-3 | 6 × (3 − 1) = 12 | 3.58 | 3.46 |
| PAM-4 | 6 × (4 − 1) = 18 | 4.17 | 4.09 |
| PAM-8 | 6 × (8 − 1) = 42 | 5.39 | 5.36 |

Each encoding scheme employs 3-phase encoding to obtain a multi-phase signal, which is modulated using PAM. The 3-phase encoding scheme used in C-PHY interfaces may be characterized as employing PAM-2 modulation. The encoding capacity of an encoding scheme may be represented as the bits per symbol, calculated as the logarithm to the base 2 of the number of states available for encoding each symbol on the multiwire link. According to certain aspects disclosed herein, the number of available states is reduced by one when clock information is embedded in transmitted signals. In certain implementations, encoding schemes may use various other numbers of pulse amplitudes, including PAM-16, PAM-32, etc.

Figure 11:
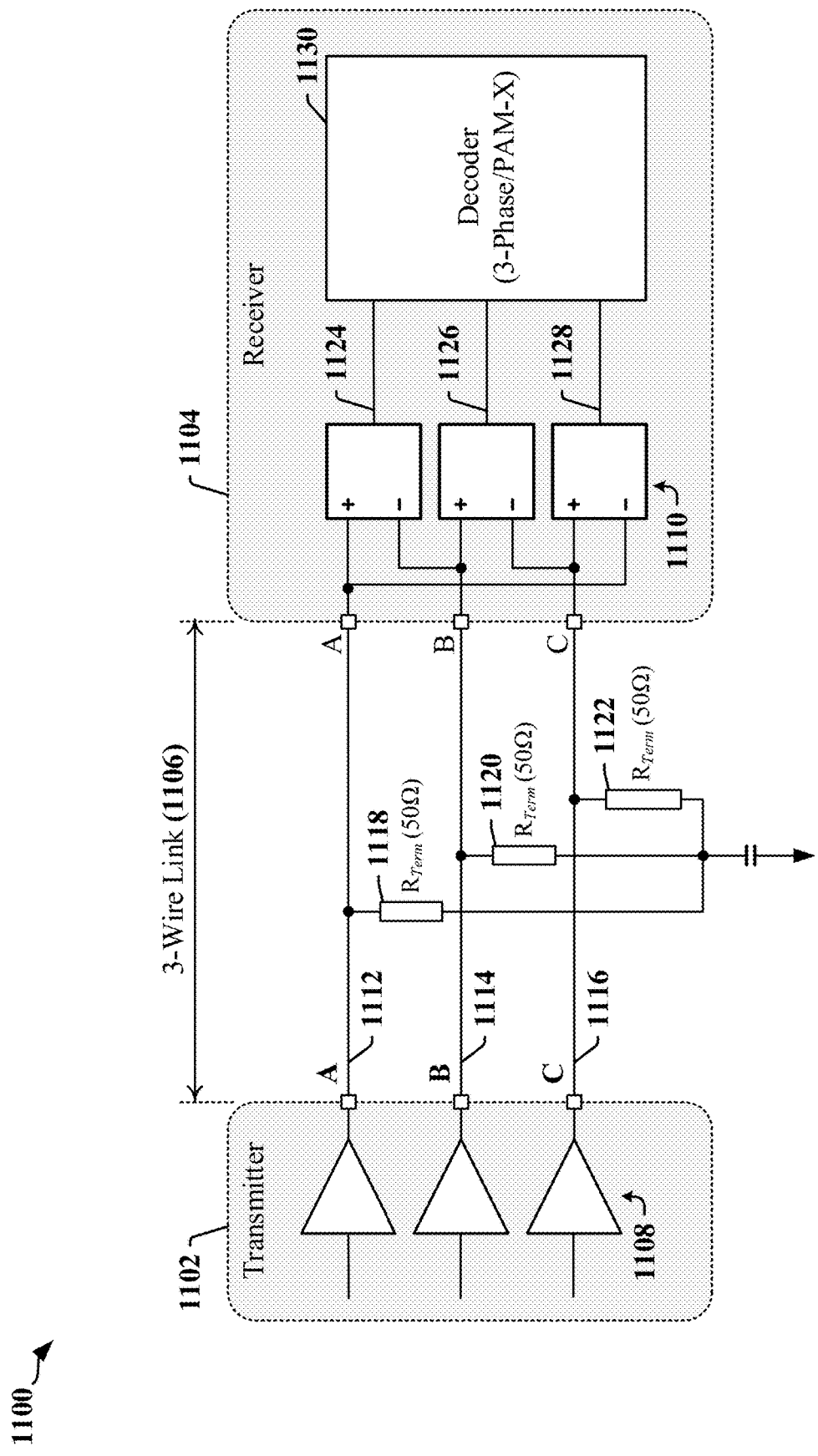
FIG. 11 illustrates an interface that is configured to support one or more combined 3-phase and PAM encoding schemes provided in accordance with certain aspects of this disclosure.

FIG. 11 shows an example of an interface 1100 that includes a transmitter 1102 and a receiver 1104 coupled through a 3-wire link 1106, where the interface 1100 is configured to support one or more encoding schemes that employ a combination of 3-phase and PAM encoding in accordance with certain aspects of this disclosure. Each wire 1112, 1114, 1116 of the 3-wire link 1106 may be terminated at the receiver by a resistor 1118, 1120, 1122 that matches the characteristic impedance of the wires 1112, 1114, 1116. In the illustrated example, the characteristic impedance may correspond to a resistance of 50Ω. The transmitter 1102 has three line drivers 1108, each configured to drive a corresponding wire 1112, 1114, 1116 in accordance with a selected or configured encoding scheme (see Table A, for example). The line drivers 1108 may be implemented as current drivers or voltage drivers. The receiver 1104 has three differential receivers 1110 that produce multi-state difference signals 1124, 1126, 1128. The multi-state difference signals 1124, 1126, 1128 are provided to a decoder 1130 that can be configured to distinguish between all possible signaling states produced by a combination of 3-phase encoding and PAM. The decoder 1130 may be configurable to decode data from signals encoded using 3-phase encoding, where the 3-phase encoded signals may be further modulated using PAM. The decoder 1130 may be configured to support the encoding schemes provided as examples in this disclosure.

Signaling states of a wire 1112, 1114, 1116 in the 3-wire link 1106 may be defined based on magnitude and direction of current flow, or based on a voltage level and polarity. In one example, the available signaling states on a wire may be defined in terms of a nominal unit current flow (I) and the states include the zero flow state, N positive flow signaling states {I, . . . NI} and N negative flow signaling states {−I, . . . −NI} for a total of 2N+1 signaling states. The 5 available states may also be expressed in terms of voltages detected at a receiver. For example, the voltage ($V_{State}$) for each state may be calculated as $V_{State}=I_{State} \times R_{Term}$, where $I_{State}$ represents the current flow associated with the signaling state being transmitted, and $R_{Term}$ corresponds to the terminating resistance or characteristic impedance of the corresponding wire 1112, 1114, 1116.

In some implementations, the differential receivers 1110 provide difference signals 1124, 1126, 1128 in the form of analog signals that are provided to a decoder that includes comparison circuits configured to convert the difference signals 1124, 1126, 1128 to digital values representative of symbols transmitted using a combination of 3-phase encoding and PAM. In some implementations, the differential receivers 1110 may include comparison circuits configured to provide the difference signals 1124, 1126, 1128 as multi-bit digital values representative of symbols transmitted using a combination of 3-phase encoding and PAM.

In one aspect of the disclosure, zero net current flows between the transmitter 1102 and the receiver 1104 during transmission of each symbol defined by the encoding schemes disclosed herein. Each symbol defines a signaling state for the trio of wires 1112, 1114, 1116 that causes the combined current flowing to the transmitter 1102 to be equal to the combined current flowing to the receiver 1104. The 3-wire link 1106 may exhibit enhanced common-mode noise rejection when the sum of the currents flowing through the 3-wire link 1106 is zero.

Figure 12:
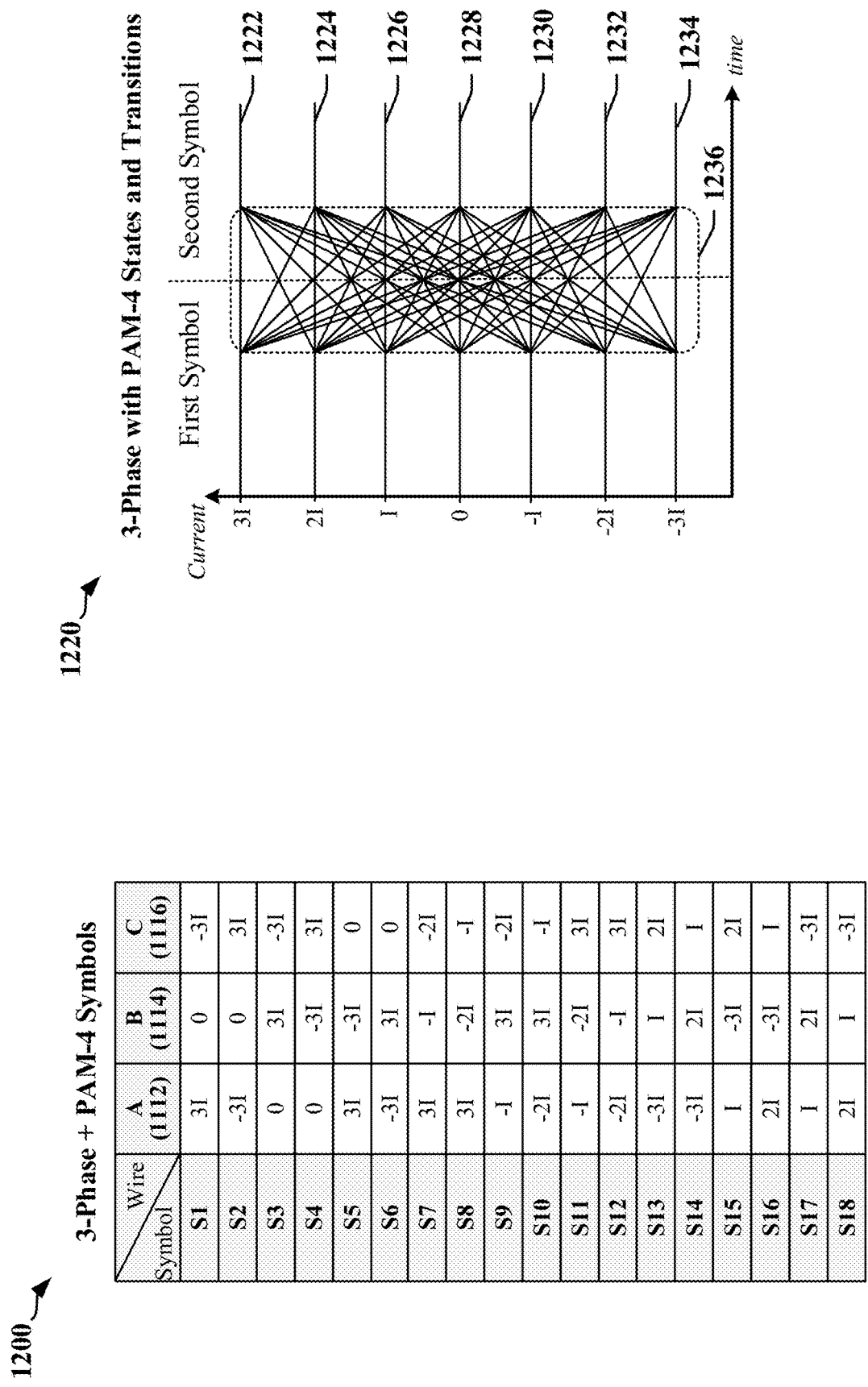
Figure 13:
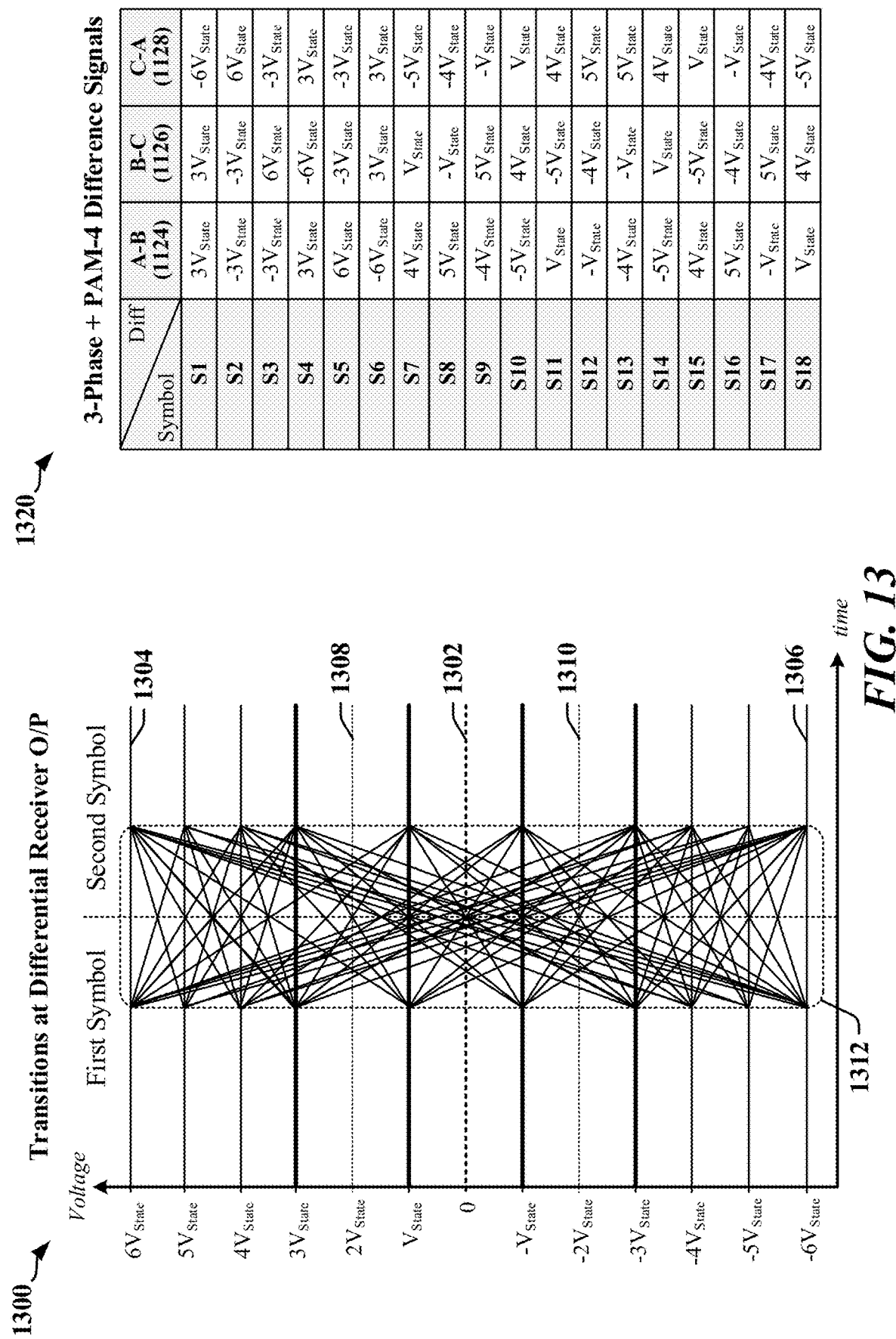

FIGS. 12-14 illustrate a first example of an encoding scheme in which 3-phase encoding is combined with PAM-4 modulation in accordance with certain aspects of this disclosure. The interface 1100 of FIG. 11 may be adapted to support the 3-phase encoding with PAM-4 modulation scheme illustrated in FIGS. 12 and 13. The table 1200 in FIG. 12 shows 18 available symbols that are selected from the symbols provided by the combination of 3-phase encoding and PAM-4 modulation. As illustrated in the timing diagram 1220 of FIG. 12, PAM-4 modulation of a 3-phase signal can provide 4 additional signaling states over the 3 signaling states provided in a C-PHY 3-phase signal (cf. the timing diagram 800 in FIG. 8). The resultant set of 7 signaling states {3I, 2I, I, 0, −I, −2I, −3I} defines the possible current flows through a wire of the 3-wire bus, here expressed as a multiple of a nominal current flow (I). The 7 signaling states may also be expressed in terms of voltages detected at a receiver.

In the transition period 1236 between symbols, six possible transitions are shown from each signaling state 1222, 1224, 1226, 1228, 1230, 1232, 1234. In the illustrated encoding scheme, less than six transitions may be available or possible on one or more of the three wires when the transitions occurring on the other two wires are taken into consideration. In each of the 18 symbols in the table 1200, no two wires 1112, 1114, 1116 in the 3-wire link 1106 are in the same signaling state. The encoding scheme illustrated in FIGS. 12 and 13 provides that two wires 1112, 1114, 1116 cannot transition such that they land in the same signaling state 1222, 1224, 1226, 1228, 1230, 1232 or 1234. In one example, where a first wire 1112, 1114 or 1116 is transitioning to the 2I state, neither of the other wires 1112, 1114 or 1116 can transition to the 2I state. A change of signaling state occurs on at least one of the wires 1112, 1114, 1116 during the transition period 1236 between consecutive symbols. Clock information may be derived by the receiver 1104 from the transitions that occur in one or more wires between each pair of consecutively transmitted symbols.

The combination of 3-phase encoding and PAM-4 modulation enables 4 bits of data to be transmitted in each symbol transmission interval. As illustrated in the table 1200, 18 symbols representing mutually distinguishable combinations of signaling states or phases may be defined when 3-phase encoding and PAM-4 modulation are combined. The availability of 18 symbols enable up to $\log_2(18) \cong 4.17$ bits to be transmitted in each symbol transmission interval. Clock information can be embedded in the transitions between consecutively transmitted symbols by prohibiting transmission of the same symbol in consecutive symbol transmission intervals in order to guarantee a change of signaling state on at least one wire 1112, 1114, 1116. When 17 of 18 symbols are available for transmission at each boundary between symbol transmission intervals, the resulting encoding rate may be calculated as $\log_2(18-1) = \log_2(17) \cong 4.08$ bits per symbol transmission interval.

FIG. 13 includes a timing diagram 1300 that illustrates the signaling states of the difference signals 1124, 1126, 1128 produced by the set of differential receivers 1110 illustrated in FIG. 11 for each of the symbols defined in the table 1200 of FIG. 12. Each signaling state may define a nominal voltage level or voltage range observed in the difference signals 1124, 1126, 1128. In the illustrated encoding scheme, 18 symbols are defined and a corresponding 18 combinations of signaling states of the difference signals 1124, 1126, 1128 may be detected at the receiver 1104. The difference in voltage levels represented by each difference signal 1124, 1126, 1128 may be a multiple of a unit of voltage ($V_{State}$), and the difference may range between $+6V_{State}$ difference 1304 and a $-6V_{State}$ difference 1306. The zero-volt difference 1302, $+2V_{State}$ difference 1308 and $-2V_{State}$ difference 1310 are not expected to be produced outside the transition period 1312, absent an error in signaling or malfunction of the transmitter 1102 or receiver 1104. The nominal value of $V_{State}$ may be determined by application requirements or objectives, and/or device specifications. The table 1320 illustrates the signaling state of the difference signals 1124, 1126, 1128 for each of the symbols defined in the table 1200 of FIG. 12.

FIG. 14 includes a table 1400 that includes symbols that do not have a wire 1112, 1114, 1116 of the 3-wire link 1106 that is undriven or driven to the mid-level signaling state 1228 in accordance with an aspect of this disclosure. The table 1400 includes two groups of symbols 1402, 1404. One wire 1112, 1114, 1116 of the 3-wire link 1106 is undriven or driven to the mid-level signaling state 1228 when a symbol from the first group of symbols 1402 is transmitted. An undriven wire 1112, 1114, 1116 may carry no current flow and/or assume the mid-point voltage level. The sum of the currents flowing between the transmitter 1102 and receiver 1104 is zero when a symbol from the first group of symbols 1402 is transmitted. No wire 1112, 1114, 1116 of the 3-wire link 1106 is undriven or driven to the mid-level signaling state 1228 when a symbol from the second group of symbols 1404 is transmitted. The sum of the currents flowing between the transmitter 1102 and receiver 1104 is zero when a symbol from the second group of symbols 1404 is transmitted. The availability of symbols that do not require that at least one wire 1112, 1114, 1116 of the 3-wire link 1106 is undriven or driven to the mid-level signaling state 1228 provides added flexibility when selecting a symbol set and can simplify design of the line drivers 1108.

Figure 15:
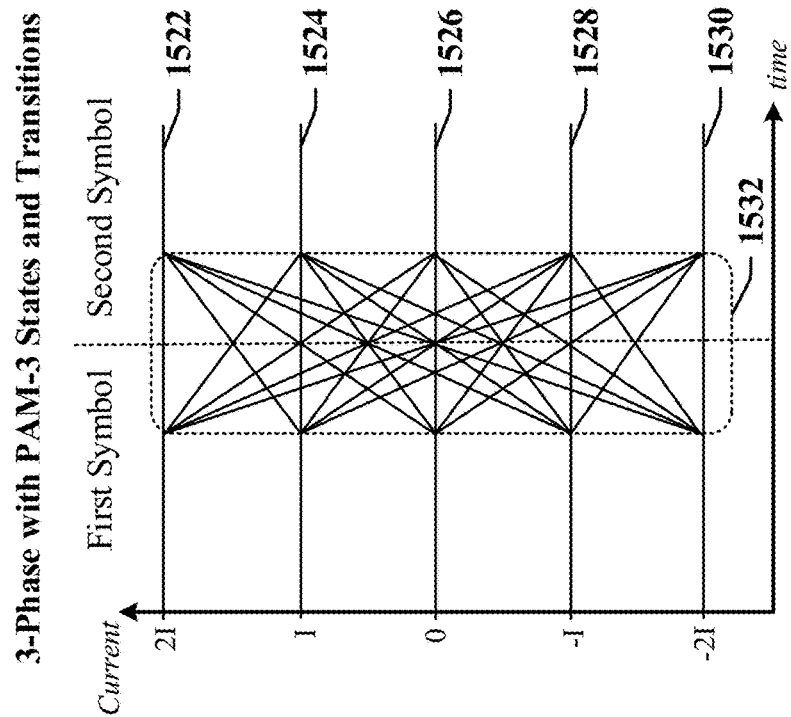
Figure 16:
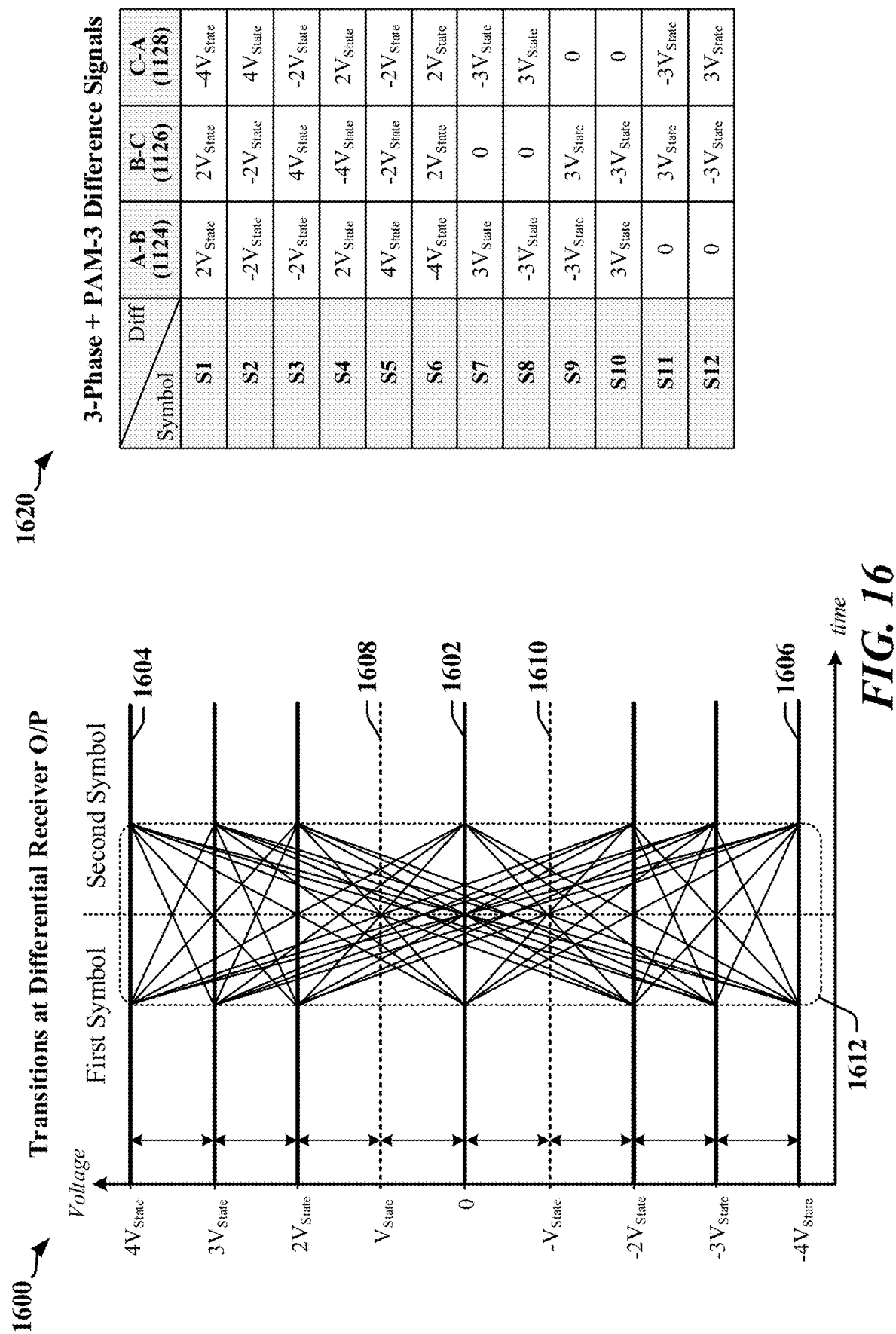

FIGS. 15-17 illustrate a second example of an encoding scheme in which 3-phase encoding is combined with PAM-3 modulation in accordance with certain aspects of this disclosure. The interface 1100 of FIG. 11 may be adapted to support the 3-phase encoding with PAM-3 modulation encoding scheme illustrated in FIGS. 15 and 16. In some instances, a PAM-3 encoder or decoder may be implemented using a PAM-4 encoder or decoder, where the two greatest amplitude PAM levels are unused during encoding. The table 1500 in FIG. 15 includes 12 symbols selected from the symbols provided through a combination of 3-phase encoding and PAM-3 modulation. As illustrated in the timing diagram 1520 of FIG. 15, PAM-3 modulation of a 3-phase signal can provide 2 additional signaling states over the 3 signaling states provided in a C-PHY 3-phase signal (cf. the timing diagram 800 in FIG. 8). The resultant set of 5 signaling states {2I, I, 0, −I, −2I} defines the possible current flows through a wire of the 3-wire bus, here expressed as a multiple of a nominal current flow (I). The 5 signaling states 1522, 1524, 1526, 1528, 1530 may also be expressed in terms of voltages detected at the receiver 1104.

In the transition period 1532 between symbols, four possible transitions are shown from each signaling state 1522, 1524, 1526, 1528, 1530. In the illustrated encoding scheme, less than four transitions may be available or possible on each of the three wires when the transitions occurring on the other two wires are taken into consideration. In one aspect of this disclosure, two wires 1112, 1114 or 1116 are in the same signaling state for a group of six symbols 1502. A change of signaling state occurs on at least one of the wires during the transition period 1532 between consecutive symbols. Clock information may be derived by a receiver from the transitions that occur in one or more wires between each pair of consecutively transmitted symbols.

The combination of 3-phase encoding and PAM-3 modulation enables 3.46 bits of data to be transmitted in each symbol transmission interval. As illustrated in the table 1500, 12 symbols representing mutually distinguishable combinations of signaling states or phases may be defined when 3-phase encoding and PAM-3 modulation are combined. The 12 symbols enable up to $\log_2(12) \cong 3.58$ bits to be transmitted in each symbol transmission interval. Clock information can be embedded in the transitions between consecutively transmitted symbols by prohibiting transmission of the same symbol in consecutive symbol transmission intervals in order to guarantee a change of signaling state on at least one wire 1112, 1114, 1116. When a change of signaling state on at least one wire is to be guaranteed, 11 of the 12 symbols are available for transmission at each boundary between symbol transmission intervals, resulting in an encoding rate of $\log_2(12-1) = \log_2(11) \cong 3.46$ bits per symbol transmission interval.

FIG. 16 includes a timing diagram 1600 that illustrates the signaling states of the difference signals 1124, 1126, 1128 produced by the set of differential receivers 1110 illustrated in FIG. 11 for each of the symbols defined in the table 1500 of FIG. 15. Each signaling state may define a nominal voltage level or voltage range observed in the difference signals 1124, 1126, 1128. In the illustrated encoding scheme, 12 symbols are defined and a corresponding 12 combinations of signaling states of the difference signals 1124, 1126, 1128 may be detected at the receiver 1104. The difference in voltage levels represented by each difference signal 1124, 1126, 1128 may be a multiple of a unit of voltage ($V_{State}$) of a wire, and the difference may range between $+4V_{State}$ difference 1604 and a $-4V_{State}$ difference 1606. The $V_{State}$ difference 1608 and $-V_{State}$ difference 1610 are not expected to be produced outside the transition period 1612, absent an error in signaling or malfunction of the transmitter or receiver. The nominal value of $V_{State}$ may be determined by application requirements or objectives, and/or device specifications. The table 1620 illustrates the signaling state of the difference signals 1124, 1126, 1128 for each of the symbols defined in the table 1500 of FIG. 15.

FIG. 17 illustrates a symbol set 1700 defined in accordance with certain aspects of this disclosure to include some symbols that do not require that one of the wires 1112, 1114, 1116 of the 3-wire link 1106 to be undriven or driven to the mid-level signaling state 1526. The symbol set 1700 includes two groups of symbols 1702, 1704. One wire 1112, 1114, 1116 of the 3-wire link 1106 is undriven or driven to the mid-level signaling state 1526 when a symbol from the first group of symbols 1702 is transmitted. An undriven wire may carry no current flow and/or assume the mid-point voltage level. The sum of the currents flowing between the transmitter 1102 and receiver 1104 is zero when a symbol from the first group of symbols 1702 is transmitted. No wire 1112, 1114, 1116 of the 3-wire link 1106 is undriven or driven to the mid-level signaling state 1526 when a symbol from the second group of symbols 1704 is transmitted. Furthermore, each symbol in the second group of symbols 1704 defines the same signaling state for two of the three wires 1112, 1114, 1116. In the illustrated example, defining two wires 1112, 1114, 1116 at the same signaling state enables the currents flowing between the transmitter 1102 and receiver 1104 to sum to zero when a symbol from the second group of symbols is transmitted. The availability of symbols that do not require that at least one wire 1112, 1114, 1116 of the 3-wire link 1106 be undriven or driven to the mid-level signaling state 1526 provides added flexibility when selecting a symbol set and can simplify design of the line drivers 1108.

FIGS. 18 and 19 illustrate a third example of an encoding scheme that combines 3-phase encoding with PAM-8 modulation in accordance with certain aspects of this disclosure. The interface 1100 of FIG. 11 may be adapted to support the 3-phase encoding with PAM-8 modulation encoding scheme illustrated in FIGS. 18 and 19. The table 1800 in FIG. 18 includes 42 symbols selected from the symbols provided through a combination of 3-phase encoding and PAM-8 modulation. PAM-8 modulation of a 3-phase signal can provide 42 additional signaling states over the 3 signaling states provided in a C-PHY 3-phase signal. The resultant set of 15 signaling states {7I, 6I, 5I, 4I, 3I, 2I, I, 0, −I, −2I, −3I, −4I, −5I, −6I, −7I} defines the possible current flows through a wire of the 3-wire bus, here expressed as a multiple of a nominal current flow (I). The 15 signaling states may also be expressed in terms of voltages detected at a receiver.

Fourteen possible transitions are possible from each signaling state. In each of the 42 symbols in the table 1800, no two wires 1112, 1114, 1116 are in the same signaling state. A change of signaling state occurs on at least one of the wires 1112, 1114, 1116 during the transition period between consecutively-transmitted symbols. Clock information may be derived by the receiver 1104 from the transitions that occur in one or more wires 1112, 1114, 1116 between each pair of consecutively-transmitted symbols. The combination of 3-phase encoding and PAM-8 modulation enables 5.36 bits of data to be transmitted in each symbol transmission interval. As illustrated in the table 1800, 42 symbols represented by mutually distinguishable combinations of signaling states or phases may be defined when 3-phase encoding and PAM-8 modulation are combined. The 42 signaling states enable up to $\log_2 (42) \cong 5.39$ bits to be transmitted in each symbol transmission interval. Clock information can be embedded in the transitions between consecutively transmitted symbols by prohibiting transmission of the same symbol in consecutive symbol transmission intervals. When a change of signaling state on at least one wire is to be guaranteed, 41 of the 42 symbols are available for transmission at each boundary between symbol transmission intervals, resulting in an encoding rate of $\log_2 (42-1) = \log_2 (41)$ 5.36 bits per symbol transmission interval.

In one aspect of this disclosure, a symbol set may be defined that includes some symbols that do not require that one of the wires 1112, 1114, 1116 of the 3-wire link 1106 to be undriven or driven to the mid-level signaling state. The table 1800 shows two groups of symbols 1802, 1804. One wire 1112, 1114, 1116 of the 3-wire link 1106 is undriven or driven to the mid-level signaling state when a symbol from the first group of symbols 1802 is transmitted. An undriven wire 1112, 1114, 1116 may carry no current flow and/or assume the mid-point voltage level. The sum of the currents flowing between the transmitter 1102 and receiver 1104 is zero when a symbol from the first group of symbols 1802 is transmitted. No wire 1112, 1114, 1116 of the 3-wire link 1106 is undriven or driven to the mid-level signaling state when a symbol from the second group of symbols 1804 is transmitted. The sum of the currents flowing between the transmitter 1102 and receiver 1104 is zero when a symbol from the second group of symbols 1804 is transmitted. The availability of symbols that do not require that at least one wire 1112, 1114, 1116 of the 3-wire link 1106 is undriven or driven to the mid-level signaling state provides added flexibility when selecting a symbol set and can simplify design of the line drivers 1108.

FIG. 19 includes a table 1900 that illustrates the signaling states of the difference signals 1124, 1126, 1128 produced by the set of differential receivers 1110 illustrated in FIG. 11 for each of the symbols defined in the table 1800 of FIG. 18. Each signaling state may define a nominal voltage level or voltage range observed in the difference signals 1124, 1126, 1128. In the illustrated encoding scheme, 42 symbols are defined and a corresponding 42 combinations of signaling states of the difference signals 1124, 1126, 1128 may be detected at the receiver 1104. The difference in voltage levels represented by each difference signal 1124, 1126, 1128 may be a multiple of a unit of voltage ($V_{State}$), and the difference may range between $+14V_{State}$ difference and a $-14V_{State}$ difference. The zero-volt difference and the $\pm 2V_{State}$, $\pm 4V_{State}$, and $\pm 6V_{State}$ differences are not expected to be produced outside transition periods, absent an error in signaling or malfunction of the transmitter 1102 or receiver 1104. The nominal value of $V_{State}$ may be determined by application requirements or objectives, and/or device specifications.

Figure 20:
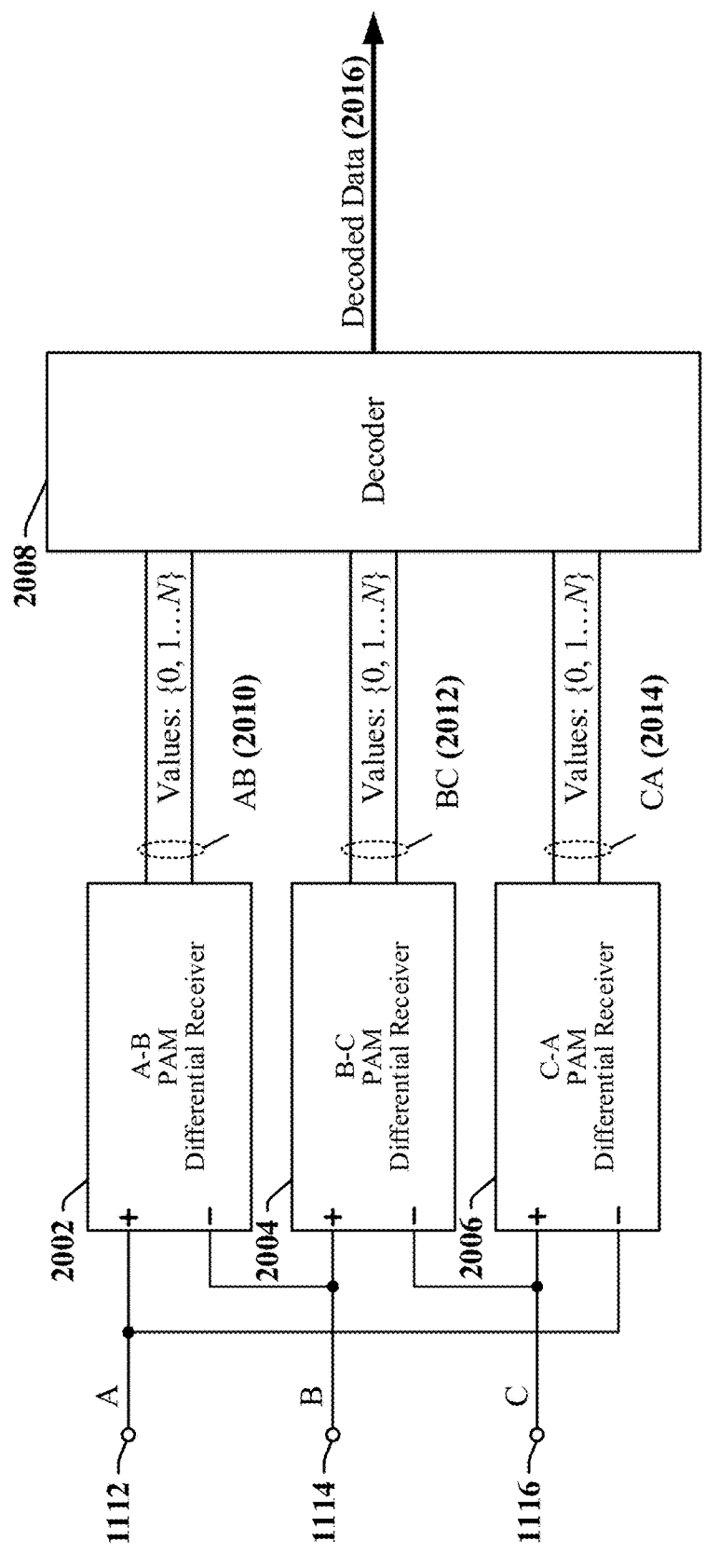
FIG. 20 illustrates a decoder to support one or more combined 3-phase and PAM encoding schemes provided in accordance with certain aspects of this disclosure.

FIG. 20 illustrates a decoder architecture 2000 provided in a receiver configured to support one or more combined 3-phase and PAM encoding schemes provided in accordance with certain aspects of this disclosure. The illustrated decoder architecture 2000 provides three PAM differential receivers 2002, 2004, 2006. The PAM differential receivers 2002, 2004, 2006 are configured to provide multibit difference values in their respective output signals 2010, 2012, 2014 that represent differences in voltages between different pairs of the three wires 1112, 1114, 1116 in the 3-wire link 1106. In some implementations provided in accordance with certain aspects of this disclosure, each PAM differential receiver 2002, 2004, 2006 provides a difference value that indicates a band of difference values that includes the difference between signaling states of two of the wires 1112, 1114, 1116.

In the example of the encoding scheme illustrated in FIGS. 12-14, the PAM differential receivers 2002, 2004, 2006 are configured for decoding symbols generated using a combination of 3-phase and PAM-4 encoding. The PAM differential receivers 2002, 2004, 2006 may be adapted or configured to support encoding schemes that use other levels of PAM, including PAM-3 and PAM-8. A first PAM differential receiver 2002 compares the signaling states of the A wire 1112 and the B wire 1114 in the 3-wire link 1106, a second PAM differential receiver 2004 compares the signaling states of the B wire 1114 and the C wire 1116 in the 3-wire link 1106, and a third PAM differential receiver 2006 compares the signaling states of the C wire 1116 and the A wire 1112 in the 3-wire link 1106. Each PAM differential receiver 2002, 2004, 2006 generates an output based on a comparison of the difference voltage present at its inputs. The PAM differential receiver 2002, 2004, 2006 generates a multi-bit digital output signals 2010, 2012, 2014 representative of the band in which the difference voltage exists, based on threshold values that define the bands. In one example, the threshold values may be set at $-2.0V_{State}$, $0.0V$ and $+2.0V_{State}$, where $V_{State}$ corresponds to a unit of voltage that represents the minimum separation between possible voltage levels. The output signals 2010, 2012, 2014 are provided to a decoder 2008 that uses the multi-bit digital output signals 2010, 2012, 2014 received in each symbol interval to assemble a sequence of wire states that can be decoded to extract encoded symbol data as the output 2016 of the decoder 2008.

Figure 21:
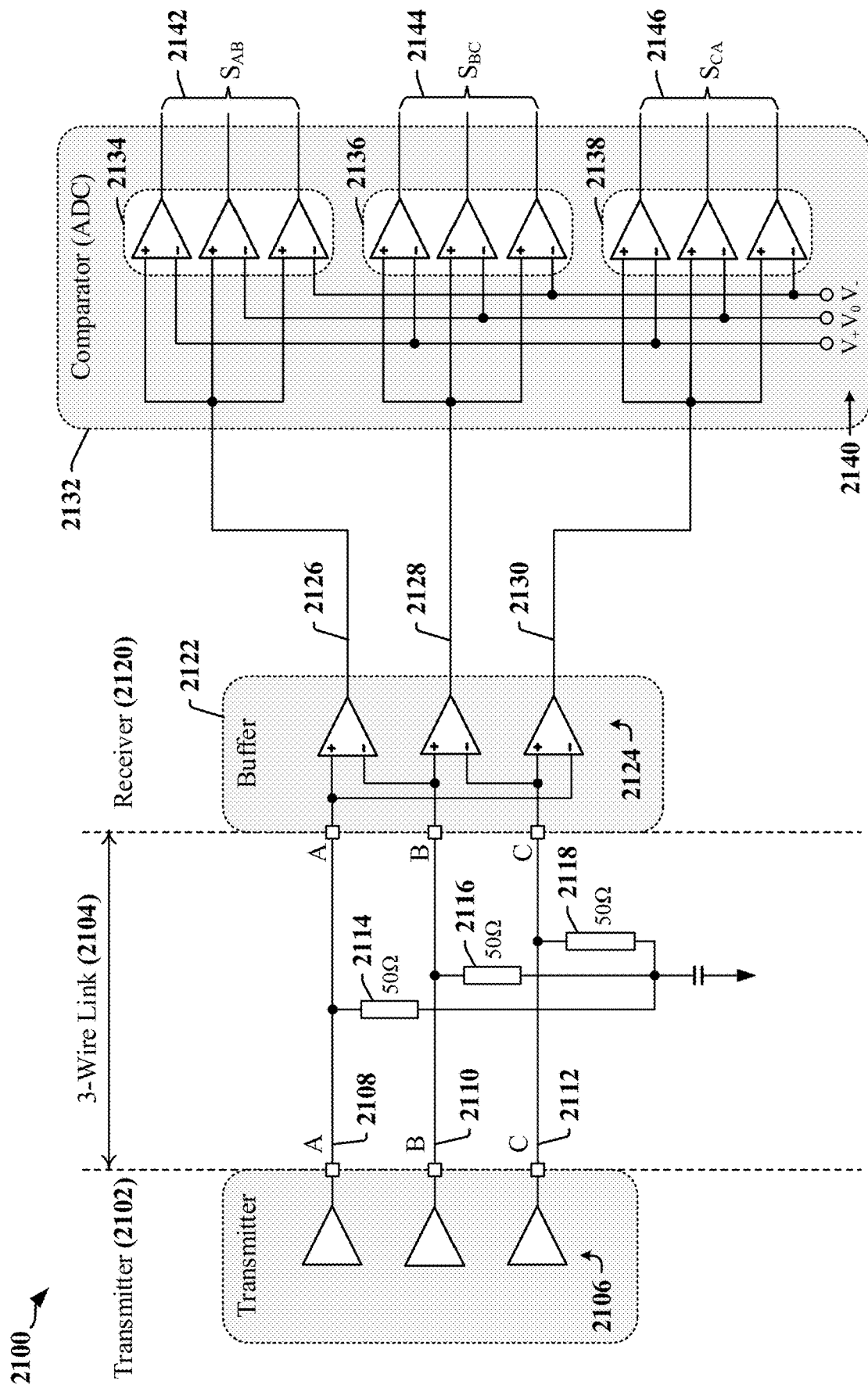
FIG. 21 illustrates an interface that employs receiver circuits configured to distinguish between symbols transmitted using a combination of 3-phase encoding and PAM-4 modulation in accordance with certain aspects of this disclosure.

FIG. 21 illustrates an example of an interface 2100 that employs a receiver 2120 configured to distinguish between symbols transmitted using a combination of 3-phase encoding and PAM-4 modulation in accordance with certain aspects of this disclosure. The receiver 2120 may be adapted or configured to support encoding schemes that use other levels of PAM, including PAM-3 and PAM-8. In one example, the receiver circuits may correspond to the receiver 1104 illustrated in FIG. 11, and/or may employ the decoder architecture 2000 illustrated in FIG. 20. The interface 2100 includes a transmitter 2102 coupled to a 3-wire link 2104. Each wire 2108, 2110, 2112 of the 3-wire link 2104 may be terminated at the receiver by a resistor 2114, 2116, 2118 that matches the characteristic impedance of the wires 2108, 2110, 2112. In the illustrated example, the characteristic impedance may correspond to a resistance of 50Ω. The transmitter 2102 has three line drivers 2106 configured to drive a corresponding wire 2108, 2110, 2112 using a combination of 3-phase encoding and PAM-4 modulation in accordance with certain aspects of this disclosure. The line drivers 2106 may be implemented as current drivers or voltage drivers.

In the illustrated example, the receiver 2120 includes a buffer circuit 2122 and a comparator circuit 2132. The buffer circuit 2122 may include differential receivers 2124 coupled to the 3-wire link 2104 and the buffer circuit 2122 may provide analog difference signals 2126, 2128, 2130 to the comparator circuit 2132. The comparator circuit 2132 may include analog-to-digital converter (ADC) circuits 2134, 2136, 2138 that produce multibit digital values 2142, 2144, 2146 representing the voltage levels of the analog difference signals 2126, 2128, 2130. In the illustrated example, the ADC circuits 2134, 2136, 2138 are implemented using a set of comparators for each difference signal 2126, 2128, 2130 where the comparators in each set compare the difference signal 2126, 2128, 2130 to multiple threshold voltage levels 2140. In one example, the threshold voltages may include the zero volt level 1602, the $+2V_{State}$ difference 1608 and the $-2V_{State}$ difference 1610 illustrated in FIG. 16.

In some implementations, the functions performed by the buffer circuit 2122 and the comparator circuit 2132 may be combined. The ADC circuits 2134, 2136, 2138 may be implemented using different types of analog and digital circuits.

FIG. 22 illustrates a voltage-mode driver 2200 configured or adapted in accordance with certain aspects of this disclosure. A transmitter may include an instance of the voltage-mode driver 2200 for each wire of a 3-wire link. The voltage-mode driver 2200 employs switches 2212, 2214, 2216, 2232, 2234, 2236 to select a voltage state for one wire 2210 of the 3-wire link. In one example, the switches 2212, 2214, 2216, 2232, 2234, 2236 can be controlled by an encoder adapted or configured to select symbols as defined in the table 1400 in FIG. 14 and may thereby encode data in transitions between transmitted symbols. The first table 2240 in FIG. 22 illustrates combinations of switch states that provide the seven signaling states 2242 defined for the wire 2210 according to certain aspects of this disclosure. A switch 2212, 2214, 2216, 2232, 2234, 2236 is closed or activated when binary-1 is indicated in the first table 2240 in FIG. 22, and a switch 2212, 2214, 2216, 2232, 2234, 2236 is open or deactivated when binary-0 is indicated in the first table 2240 in FIG. 22.

The switches 2212, 2214, 2216, 2232, 2234, 2236 may be used to configure a network of resistors in the voltage-mode driver 2200. Each of the switches 2212, 2214, 2216, 2232, 2234, 2236 is coupled to a corresponding resistor 2202, 2204, 2206, 2222, 2224, 2226. The values of the resistors 2202, 2204, 2206, 2222, 2224, 2226 are selected such that each combination of resistances 2250 can be provided by coupling two or more of the resistors 2202, 2204, 2206, 2222, 2224, 2226 to the wire 2210 presents a combined resistance that matches the characteristic impedance associated with the wire 2210. In the illustrated example, three resistors 2202, 2204, 2206 coupled to a positive voltage 2208 and three resistors 2222, 2224, 2226 coupled to ground or another voltage lower than the positive voltage 2208 can be combined to provide each of the states defined by the symbols defined in the table 1400 in FIG. 14. Three resistance values are defined for the illustrated example: the resistors 2202, 2222 have a resistance value of 6R, the resistors 2204, 2224 have a resistance value of 3R and the resistors 2206, 2226 have a resistance value of 1.5R, where R is the resistance value that matches the characteristic impedance associated with the wire 2210. Two or more of the resistors 2202, 2204, 2206, 2222, 2224, 2226 coupled to the wire 2210 appear as parallel resistance with respect to the characteristic impedance. The second table 2260 in FIG. 22 defines the combinations of parallel resistances that produce impedance matching resistance values 2262 or intermediate resistance values 2264 that are part of a larger parallel combination that produces one of the impedance matching resistance values 2262. The second table 2260 in FIG. 22 is usable with the voltage-mode driver 2200. Parallel resistance of a pair of resistors (R1 and R2) may be calculated as:

$$\frac{R1 \times R2}{R1 + R2}.$$

The seven signaling states 2242 are obtained using a corresponding combination of switch states identified in the first table 2240 in FIG. 22.

Figure 23:
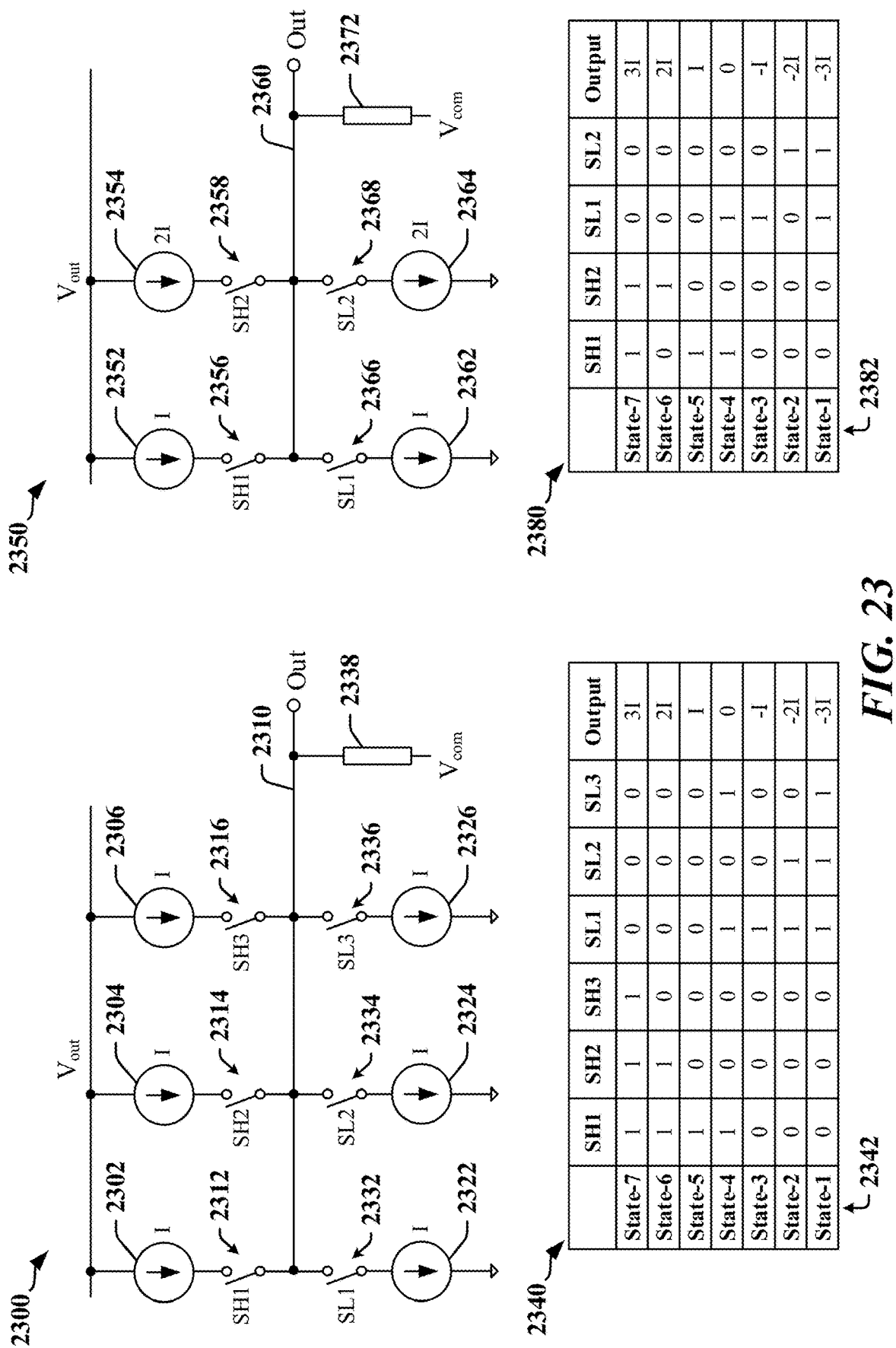
FIG. 23 illustrates examples of current-mode drivers configured or adapted in accordance with certain aspects of this disclosure.

FIG. 23 illustrates examples of current-mode drivers 2300, 2350 that may be configured or adapted in accordance with certain aspects of this disclosure. A transmitter may include an instance of the current-mode driver 2300 or 2350 for each wire of a 3-wire link. The first current-mode driver 2300 employs switches 2312, 2314, 2316, 2332, 2334, 2336 to select a signaling state for one wire 2310 of the 3-wire link. In one example, the switches 2312, 2314, 2316, 2332, 2334, 2336 can be controlled by an encoder adapted or configured to encode data in the symbols defined in the table 1400 in FIG. 14. The first table 2340 in FIG. 23 illustrates combinations of switch states that provide the seven signaling states 2342 defined for the wire 2310 according to certain aspects of this disclosure. A switch 2312, 2314, 2316, 2332, 2334, 2336 is closed or activated when binary-1 is indicated in the first table 2340 in FIG. 23, and a switch 2312, 2314, 2316, 2332, 2334, 2336 is open or deactivated when binary-0 is indicated in the first table 2340 in FIG. 23.

Each of the switches 2312, 2314, 2316, 2332, 2334, 2336 is coupled to a corresponding current source 2302, 2304, 2306, 2322, 2324, 2326. In the illustrated example, each of the current sources 2302, 2304, 2306, 2322, 2324, 2326 sources or sinks a unit of current (I) when coupled to the wire 2310 by a corresponding switch 2312, 2314, 2316, 2332, 2334, 2336. Multiple units of current are sourced or sunk when two or more of the current sources 2302, 2304, 2306, 2322, 2324, 2326 are concurrently coupled to the wire 2310. The wire 2310 may be terminated using an impedance matching resistance 2338.

The second current-mode driver 2350 can operate with fewer current sources 2352, 2354, 2362, 2364 than the first current-mode driver 2300. The current sources 2302, 2304, 2306, 2322, 2324, 2326 in the first current-mode driver 2300 are rated to source or sink the same nominal unit current value. The second current-mode driver 2350 includes first current sources 2352, 2362 that source or sink the unit current value and second current sources 2354, 2364 that source or sink double the unit current value. The second current-mode driver 2350 operates switches 2356, 2358, 2366, 2368 to select a total current that produces a desired signaling state for one wire 2360 of the 3-wire link.

The second table 2380 in FIG. 23 illustrates combinations of switch states that provide the seven signaling states 2382 defined for the wire 2360 according to certain aspects of this disclosure. A switch 2356, 2358, 2366, 2368 is closed or activated when binary-1 is indicated in the second table 2380 in FIG. 23, and a switch 2356, 2358, 2366, 2368 is open or deactivated when binary-0 is indicated in the second table 2380 in FIG. 23. The wire 2360 may be terminated using an impedance matching resistance 2372.

Figure 24:
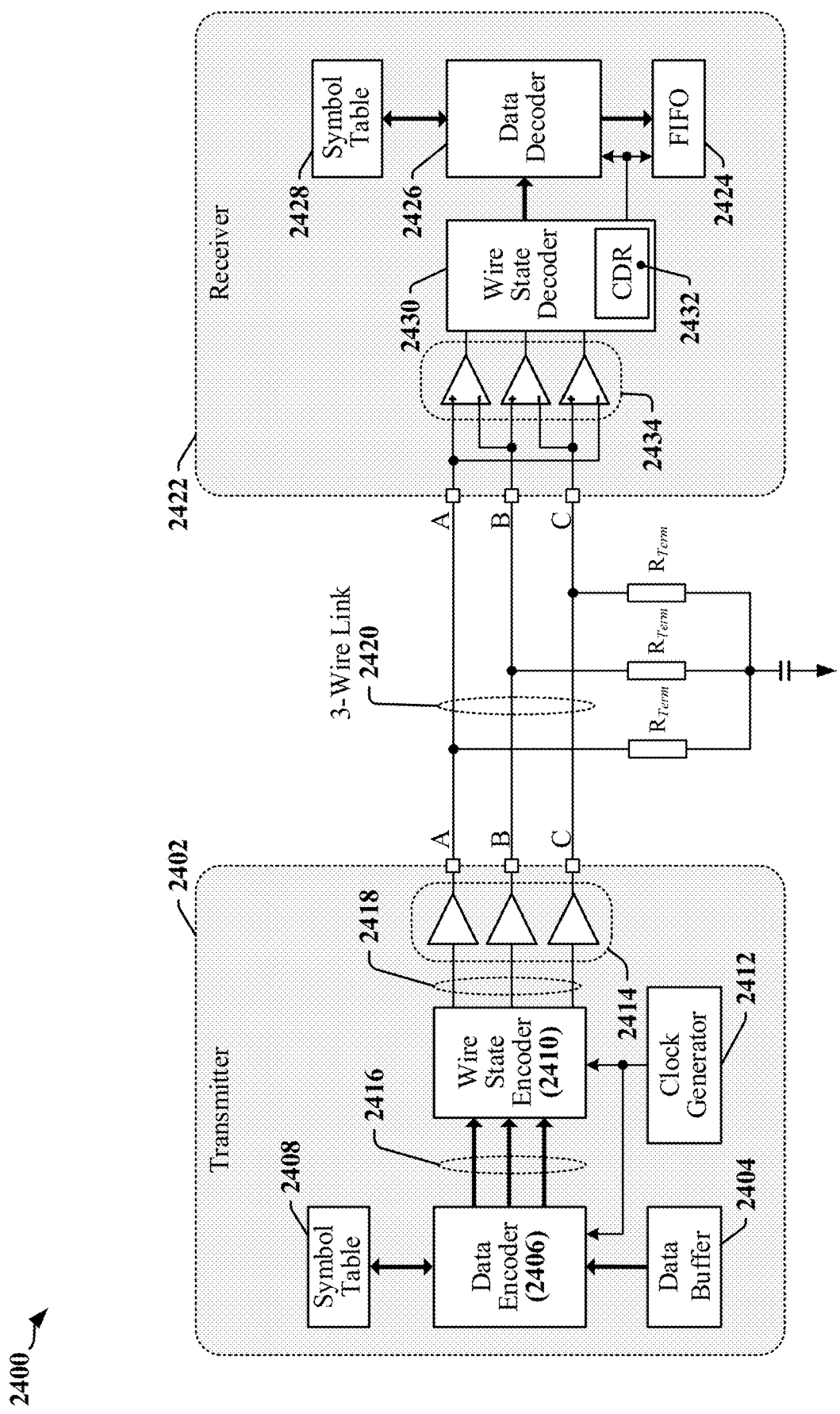
FIG. 24 illustrates an example of a system that has been adapted to support an encoding scheme that modulates a multi-phase signal using PAM in accordance with certain aspects disclosed herein.

FIG. 24 illustrates an example of a system 2400 that has been adapted to support an encoding scheme that uses a combination of 3-phase encoding and PAM in accordance with certain aspects disclosed herein. A transmitter 2402 is coupled to a receiver 2422 by a 3-wire link 2420.

The transmitter 2402 includes a data buffer 2404 that receives and holds data to be communicated to the receiver 2422. The data may be received by the data buffer 2404 from an application processor, peripheral, sensor, storage device, imaging device, display, or another source of data. In some examples, the data is stored as 8-bit bytes, 16-bit, 32-bit or 64-bit words, or words of another size. In some examples, each unit of data is stored with parity bits, and/or error-checking bits; for example, a parity bit may be provided for each byte, and/or parity bits or cyclic redundancy bits may be calculated for a block of data bytes or words and transmitted as additional bytes or words. In some instances, the data may be encapsulated with control information in packets or other data structures generated in accordance with one or more layers of a communication protocol. The data buffer 2404 may be provided to a data encoder 2406 in a size defined by the application. The data encoder 2406 may include components configured to reformat data received from the data buffer 2404, map the reformatted data to one or more symbols, and serialize or otherwise sequence the symbols for transmission in accordance with a transmission clock.

In certain implementations, the data encoder 2406 receives data from the data buffer 2404 in unit sizes that are sized according to the encoding rate associated with the encoding scheme. In some examples, the data encoder 2406 is configured to process data in 8-bit bytes, 16-bit words or 32-bit words. In some examples, the data encoder 2406 may include circuits that reorganize data supplied by the data buffer 2404 to a set of 8-bit bytes or 16-bit words such that the unit size of data is constant regardless of the encoding scheme configured for the data encoder 2406. In one example, the data encoder 2406 generates three multi-bit codes 2416 representing the signaling state of each wire of the 3-wire link 2420 during each symbol transmission interval. The data encoder 2406 provides the three multi-bit codes 2416 to the wire state encoder 2410. The wire state encoder 2410 generates control signals 2418 that are provided to the line drivers 2414. Each of the line drivers 2414 receives one or more of the control signals 2418, which it uses to define the signaling state of a corresponding wire of the 3-wire link 2420.

In certain implementations, each of the three multi-bit codes 2416 may cause the wire state encoder 2410 to generate a set of control signals 2418 that configure switches in the line drivers 2414, where the state of the switches (e.g., closed or open) may select current or voltage levels to be provided to the wires of the 3-wire link 2420. The state of the control signals 2418 generated by the wire state encoder 2410 responsive to the three multi-bit codes 2416 may be configured based on the active encoding scheme or on the type of line driving circuit used to implement the line drivers 2414. Different types of line driving circuits may have different numbers of switches to be controlled to select a desired signaling state. For example, the number of signals needed to control the switches of the voltage-mode driver 2200 of FIG. 22 may be greater than the number of signals needed to control the switches of the current-mode driver 2300 of FIG. 23. Operations of the data encoder 2406 and wire state encoder 2410 may be performed in accordance with timing information indicated in a clock signal provided by a clock generator.

The data encoder 2406 operates to cause a stream of symbols to be transmitted on the 3-wire link 2420, where each symbol is transmitted as a combination of signaling states of the 3 wires of the 3-wire link 2420. The tables 1200, 1500 and 1800 in FIGS. 12, 15 and 18, illustrate examples of the symbols generated for certain encoding schemes and the corresponding signaling states defined for each symbol. The data encoder 2406 may be configured for one or more modes of operation and for one or more encoding schemes.

In a first example, the transmitter 2402 may be actively transmitting a stream of symbols over the 3-wire link 2420, where the data encoder 2406 has generated an $N^{th}$ symbol ($S_N$) and has added $S_N$ to the stream of symbols. The data encoder 2406 may be configured for a first mode of operation in which each unit of data is encoded independently. In this first mode, the data encoder 2406 uses the next unit of data to be encoded to select a next symbol for transmission. In one example, the data encoder 2406 may generate an index used to select a next symbol ($S_{N+1}$), where the index to $S_{N+1}$ is generated using the next four bits as an offset from the index to $S_N$. The index is generated in a manner that prevents the selection of the same symbol as $S_N$ and $S_{N+1}$. In one example, the index to $S_{N+1}$ may be calculated by addition or subtraction of the next four bits to the index to $S_N$. In another example, the index to $S_{N+1}$ may be calculated using an algorithm that receives the next four bits and the index to $S_N$ as variables.

In a second example, the transmitter 2402 may be actively transmitting a stream of symbols over the 3-wire link 2420, where the data encoder 2406 has generated an $N^{th}$ symbol ($S_N$) and has added $S_N$ to the stream of symbols. The data encoder 2406 may be configured for a second mode of operation in which one or more bytes of data are encoded in a sequence of symbols $\{S_{N+1}, S_{N+2}, \ldots\}$. In one example, the data encoder 2406 uses the value of $S_N$ and one or more data bytes to index a table that maintains sequences of symbols. In another example, the data encoder 2406 uses the one or more data bytes to index a table that maintains sets of offsets used to select a sequence of symbols based on the value of $S_N$. The data encoder 2406 produces the sequence of symbols by using the combined offsets to generate an index to a next symbol from the index used to generate the previously generated symbol. For example, the data encoder 2406 may generate an index to the symbol table 2408 for selecting $S_{N+1}$ based on the value of the first offset in the set of offsets and the index used to select $S_N$. In some instances, the set of offsets may be obtained by indexing a table using the content of the one or more bytes as an index. In some instances, the set of offsets may be generated by breaking the units of data into one or more bytes or words.

In some implementations, the data encoder 2406 may include or be coupled to parallel-to-serial convertors that convert symbols expressed as a block of multi-bit codes representative of the signaling states of the 3-wire link 2420 into a time-ordered sequence of symbols. A sequence of symbols $\{S_1, S_2, \ldots S_N, S_{N+1}, \ldots\}$ may be transmitted in corresponding symbol transmission intervals $\{t_1, t_2, \ldots t_N, t_{N+1}, \ldots\}$, where the symbol transmission intervals are defined based on a clock signal provided by the clock generator 2412. The sequence of multi-bit codes 2416 provided to the wire state encoder 2410 include an Nth symbol ($S_N$) that is used to generate signaling state of the 3-wire link 2420 during a corresponding Nth symbol transmission interval ($t_N$) symbol, followed by an (N+1)th symbol ($S_{N+1}$) that is used to generate signaling state of the 3-wire link 2420 during a corresponding (N+1)th symbol transmission interval ($t_{N+1}$).

The receiver 2422 includes differential receivers 2434 that receive signals from the 3-wire link 2420. The differential receivers 2434 may be operable to discriminate between the N signaling states defined in an encoding scheme that modulates a multi-phase signal using PAM in accordance with certain aspects disclosed herein. The differential receivers 2434 provide differential output signals to a wire state decoder 2430 that is configured to extract a symbol from the differential output signals. The symbol is then provided to a data decoder 2426 that may be configured to operate on individual symbols or on groups of symbols. The data decoder 2426 may include components configured to deserialize received symbols and demap one or more symbols to obtain decoded data. The data decoder 2426 may include components configured to reassemble and reformat the decoded data.

In one mode operation, the data decoder 2426 may use a difference between received symbol ($S_{N+1}$) and a preceding symbol ($S_N$) to index a symbol table 2428 to obtain 4 bits of decoded data. In another mode operation, the data decoder 2426 may use a received sequence of symbols and a preceding symbol ($S_N$) to index the symbol table 2428 to obtain 8, 16, 32 or more bits of decoded data. Decoded data may be provided to a first-in, first-out register (FIFO 2424) or another buffer.

The wire state decoder 2430 may include a clock and data recovery circuit (CDR 2432) that detects transitions in signaling state on one or more wires of the 3-wire link 2420 and generates a clock signal based on the timing of the transition. The clock signal may be used by the data decoder 2426, FIFO 2424 and other components of the receiver 2422 may operate in accordance with the clock signal.

Examples of Processing Circuits and Methods

Figure 25:
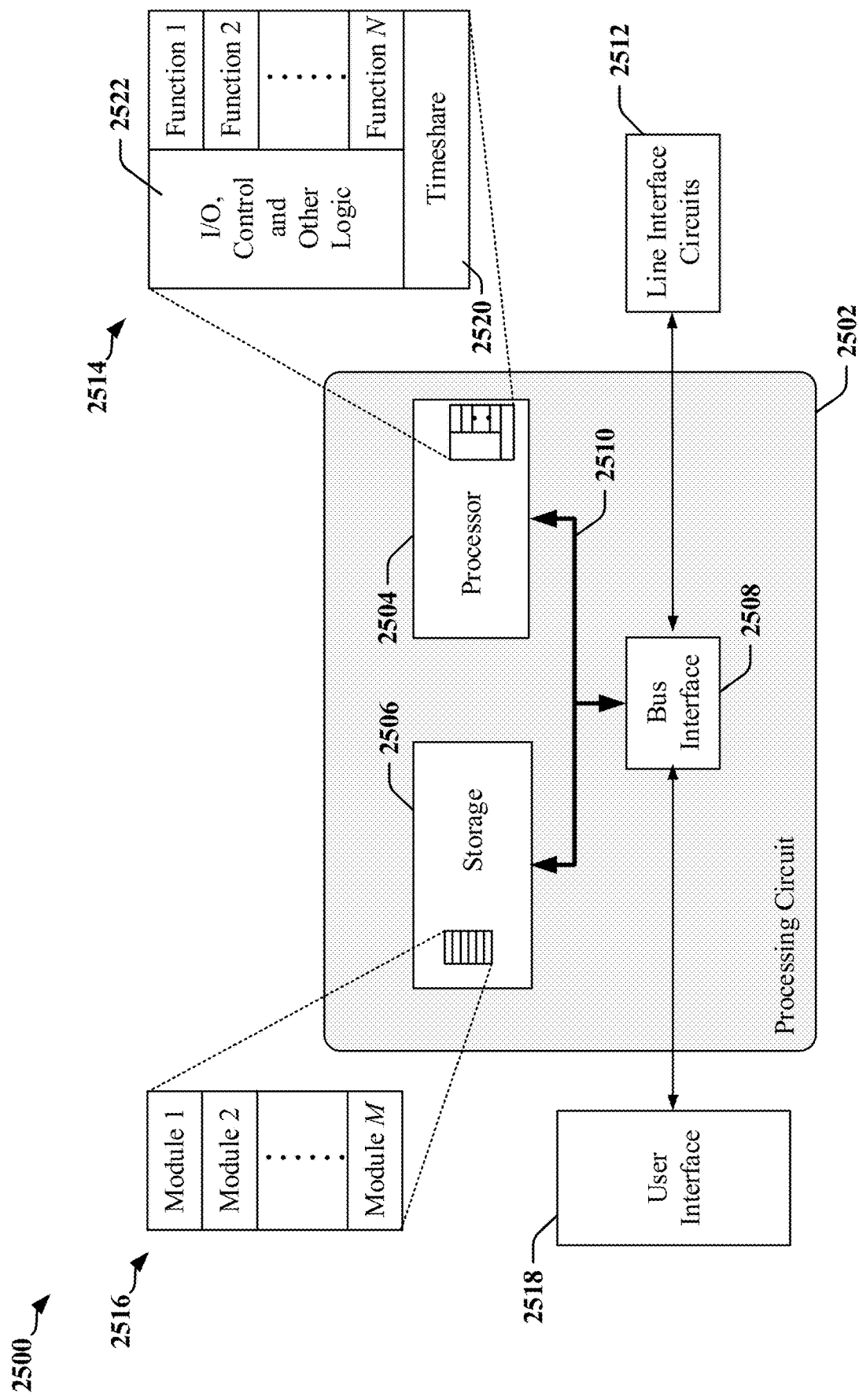
FIG. 25 illustrates an example of an apparatus employing a processing circuit that may be adapted according to certain aspects disclosed herein.

FIG. 25 is a conceptual diagram 2500 illustrating an example of a hardware implementation for an apparatus employing a processing circuit 2502 that may be configured to perform one or more functions disclosed herein. In accordance with various aspects of the disclosure, an element, or any portion of an element, or any combination of elements as disclosed herein may be implemented using the processing circuit 2502. The processing circuit 2502 may include certain devices, circuits, and/or logic that support the various encoding schemes disclosed herein. In one example, the processing circuit 2502 may include some combination of circuitry and modules that facilitates the encoding of data into symbols, and line drivers that are adapted to assert three or more voltage levels on the wires of a serial bus. In another example, the processing circuit 2502 may include some combination of circuitry and modules that facilitates the encoding of data into symbols using an encoding scheme through a combination of 3-phase encoding and PAM in accordance with certain aspects disclosed herein. The processing circuit 2502 may include a state machine or another type of processing device that manages encoding and/or decoding processes as disclosed herein.

The processing circuit 2502 may include one or more processors 2504 that are controlled by some combination of hardware and software modules. Examples of processors 2504 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2504 may include specialized processors that perform specific functions, and that may be configured, augmented or controlled by one of the software modules 2516. The one or more processors 2504 may be configured through a combination of software modules 2516 loaded during initialization, and further configured by loading or unloading one or more software modules 2516 during operation.

In the illustrated example, the processing circuit 2502 may be implemented with a bus architecture, represented generally by the bus 2510. The bus 2510 may include any number of interconnecting buses and bridges depending on the specific application of the processing circuit 2502 and the overall design constraints. The bus 2510 links together various circuits including the one or more processors 2504, and a processor-readable storage medium 2506. The processor-readable storage medium 2506 may include memory devices and mass storage devices, and may be referred to herein as computer-readable media and/or processor-readable media. The bus 2510 may also link various other circuits such as timing sources, timers, peripherals, voltage regulators, and power management circuits. A bus interface 2508 may provide an interface between the bus 2510 and one or more transceivers 2512. A transceiver 2512 may be provided for each networking technology supported by the processing circuit. In some instances, multiple networking technologies may share some or all of the circuitry or processing modules found in a transceiver 2512. Each transceiver 2512 provides a means for communicating with various other apparatus over a transmission medium. Depending upon the nature of the apparatus, a user interface 2518 (e.g., keypad, display, speaker, microphone, joystick) may also be provided, and may be communicatively coupled to the bus 2510 directly or through the bus interface 2508.

A processor 2504 may be responsible for managing the bus 2510 and for general processing that may include the execution of software stored in a processor-readable medium that may include the processor-readable storage medium 2506. In this respect, the processing circuit 2502, including the processor 2504, may be used to implement any of the methods, functions and techniques disclosed herein. The processor-readable storage medium 2506 may be used for storing data that is manipulated by the processor 2504 when executing software, and the software may be configured to implement any one of the methods disclosed herein.

One or more processors 2504 in the processing circuit 2502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 2506 or in another, external processor-readable medium. The processor-readable storage medium 2506 may include a non-transitory processor-readable medium. A non-transitory processor-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The processor-readable storage medium 2506 may also include, by way of example, a carrier wave, a transmission line, and any other suitable medium for transmitting software and/or instructions that may be accessed and read by a computer. Processor-readable storage medium 2506 may reside in the processing circuit 2502, in the processor 2504, external to the processing circuit 2502, or be distributed across multiple entities including the processing circuit 2502. The processor-readable storage medium 2506 may be embodied in a computer program product. By way of example, a computer program product may include a processor-readable medium in packaging materials. Those skilled in the art will recognize how best to implement the described functionality presented throughout this disclosure depending on the particular application and the overall design constraints imposed on the overall system.

The processor-readable storage medium 2506 may maintain software maintained and/or organized in loadable code segments, modules, applications, programs, etc., which may be referred to herein as software modules 2516. Each of the software modules 2516 may include instructions and data that, when installed or loaded on the processing circuit 2502 and executed by the one or more processors 2504, contribute to a run-time image 2514 that controls the operation of the one or more processors 2504. When executed, certain instructions may cause the processing circuit 2502 to perform functions in accordance with certain methods, algorithms and processes described herein.

Some of the software modules 2516 may be loaded during initialization of the processing circuit 2502, and these software modules 2516 may configure the processing circuit 2502 to enable performance of the various functions disclosed herein. For example, some software modules 2516 may configure internal devices and/or logic circuits 2522 of the processor 2504, and may manage access to external devices such as the transceiver 2512, the bus interface 2508, the user interface 2518, timers, mathematical coprocessors, and so on. The software modules 2516 may include a control program and/or an operating system that interacts with interrupt handlers and device drivers, and that controls access to various resources provided by the processing circuit 2502. The resources may include memory, processing time, access to the transceiver 2512, the user interface 2518, and so on.

One or more processors 2504 of the processing circuit 2502 may be multifunctional, whereby some of the software modules 2516 are loaded and configured to perform different functions or different instances of the same function. The one or more processors 2504 may additionally be adapted to manage background tasks initiated in response to inputs from the user interface 2518, the transceiver 2512, and device drivers, for example. To support the performance of multiple functions, the one or more processors 2504 may be configured to provide a multitasking environment, whereby each of a plurality of functions is implemented as a set of tasks serviced by the one or more processors 2504 as needed or desired. In one example, the multitasking environment may be implemented using a timesharing program 2520 that passes control of a processor 2504 between different tasks, whereby each task returns control of the one or more processors 2504 to the timesharing program 2520 upon completion of any outstanding operations and/or in response to an input such as an interrupt. When a task has control of the one or more processors 2504, the processing circuit is effectively specialized for the purposes addressed by the function associated with the controlling task. The timesharing program 2520 may include an operating system, a main loop that transfers control on a round-robin basis, a function that allocates control of the one or more processors 2504 in accordance with a prioritization of the functions, and/or an interrupt driven main loop that responds to external events by providing control of the one or more processors 2504 to a handling function.

Figure 26:
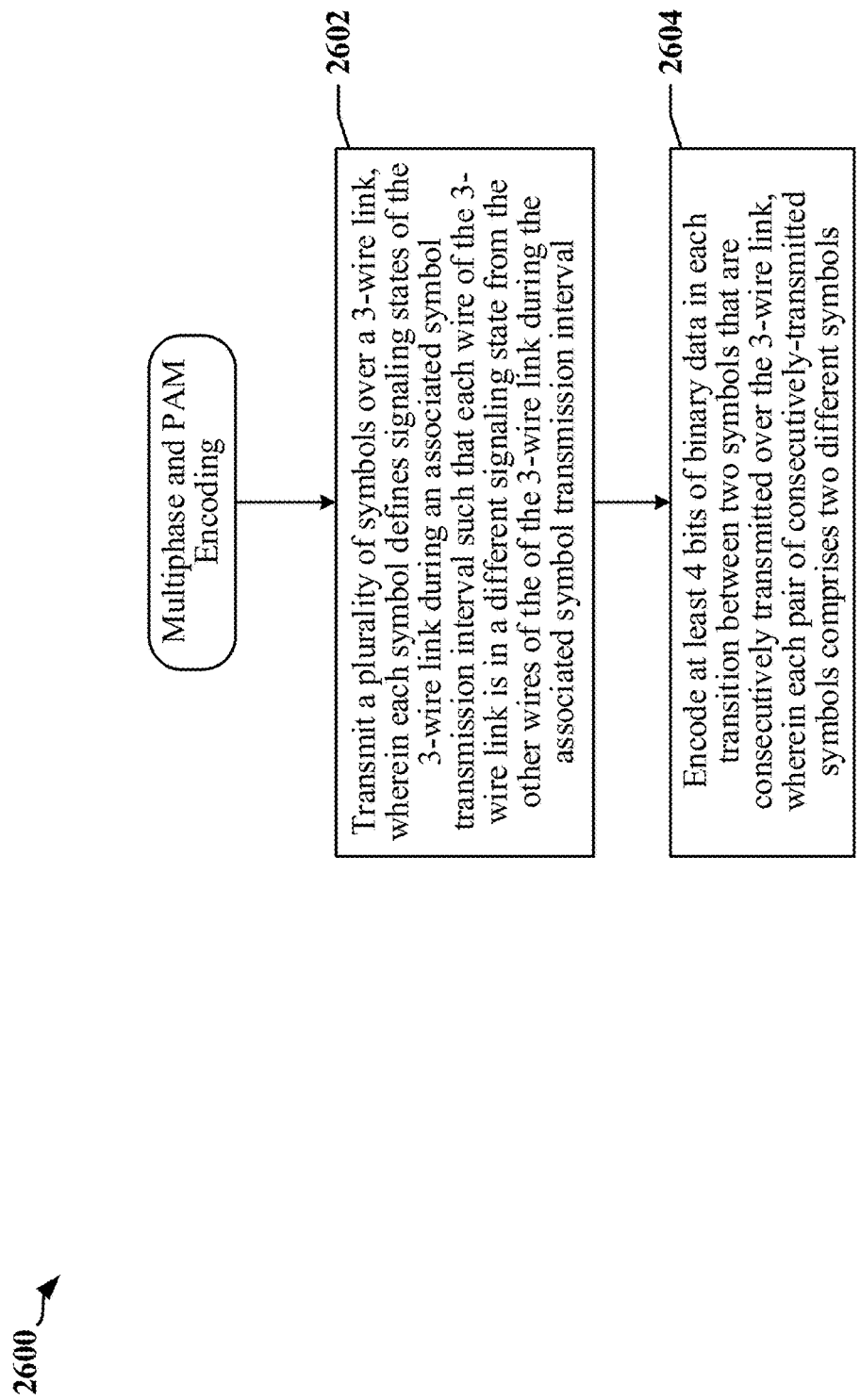
FIG. 26 is a flow chart of a method performed at a receiver according to certain aspects disclosed herein.

FIG. 26 is a flow chart 2600 of a data communication method that may be performed at a transmitter coupled to a multi-wire communication link. In one example, the communication link may have three wires and data may be encoded in phase state and amplitude of a signal transmitted in different phases on each of the three wires. The method may be performed, at least in part, at the transmitter 2402 illustrated in FIG. 24. At block 2602, the transmitter 2402 may transmit a plurality of symbols over a 3-wire link. Each symbol defines signaling states of the 3-wire link during an associated symbol transmission interval such that each wire of the 3-wire link is in a different signaling state from the other wires of the 3-wire link during the associated symbol transmission interval. At block 2604, the transmitter 2402 may encode at least 3 bits of binary data in each transition between two symbols that are consecutively transmitted over the 3-wire link, where each pair of consecutively-transmitted symbols includes two different symbols.

In some implementations, at least one symbol transmitted over the 3-wire link defines non-zero current flows for each wire of the 3-wire link, where a sum of the non-zero current flows is zero. The signaling states of the wires of the 3-wire link may include seven voltage levels, where at least one symbol transmitted over the 3-wire link defines a voltage level for each wire of the 3-wire link that is above or below a middle voltage level of the seven voltage levels. The transmitter 2402 may select each symbol for transmission from a set of symbols defined for the 3-wire link. In certain examples, an active encoding scheme may provide a set of symbols that includes up to 12, 18, 42 available symbols.

In some implementations, the transmitter 2402 may use a combination of 3-phase encoding and PAM to encode the at least 3 bits of binary data. The transmitter 2402 may transmit a first symbol over the 3-wire link. The data encoder may select the first symbol from a set of 12 symbols when the data encoder is configured for a first encoding scheme. The data encoder may select the first symbol from a set of 18 symbols when the data encoder is configured for a second encoding scheme. The data encoder may select the first symbol from a set of 42 symbols when the data encoder is configured for a third encoding scheme. The transmitter 2402 may transmit a second symbol over the 3-wire link. The data encoder may select the second symbol from a set of available symbols that excludes the first symbol.

In some implementations, the transmitter 2402 may provide control signals to a plurality of line drivers that cause each of the plurality of line drivers to drive one wire of the 3-wire link to a signaling state defined by each symbol during a symbol transmission interval provided for each symbol.

In one example, the plurality of line drivers may include three voltage drivers, and the transmitter 2402 may configure a plurality of switches in each voltage driver such that each wire of the 3-wire link is coupled to one or more voltage levels through two or more resistors in one of the three voltage drivers during each symbol transmission interval. The transmitter 2402 may configure the plurality of switches in each voltage driver in each symbol transmission interval such that a combination of resistors coupled to a corresponding wire of the 3-wire link matches a characteristic impedance of the corresponding wire of the 3-wire link. In another example, the plurality of line drivers includes three current drivers, and the transmitter 2402 may configure a plurality of switches that causes each of the three current drivers to provide a current in a corresponding wire of the 3-wire link that has a magnitude defined by a symbol being transmitted in a current symbol transmission interval. In some instances, resistors are coupled to the 3-wire link and match a characteristic impedance of the 3-wire link.

In some instances, control signals may be provided to the line drivers that cause each of the line drivers to drive one wire of the 3-wire link to a signaling state defined by a symbol transmitted during a symbol transmission interval. When voltage-mode line drivers are used, the control signals may configure a plurality of switches in the line drivers such that each wire of the 3-wire link is coupled to one or more voltage levels through one or more resistors during each symbol transmission interval. The plurality of switches may be configured in each symbol transmission interval such that each combination of resistors coupled to a wire of the 3-wire link matches a characteristic impedance of the 3-wire link. When current-mode line drivers are used, the control signals may configure a plurality of switches in the plurality of line drivers such that each wire of the 3-wire link is coupled to a current driver that provides a current in the each wire, where the current has a magnitude defined by a symbol being transmitted in in its corresponding symbol transmission interval. The current-mode line drivers may include resistors that are coupled to the 3-wire link to match a characteristic impedance of the 3-wire link.

Figure 27:
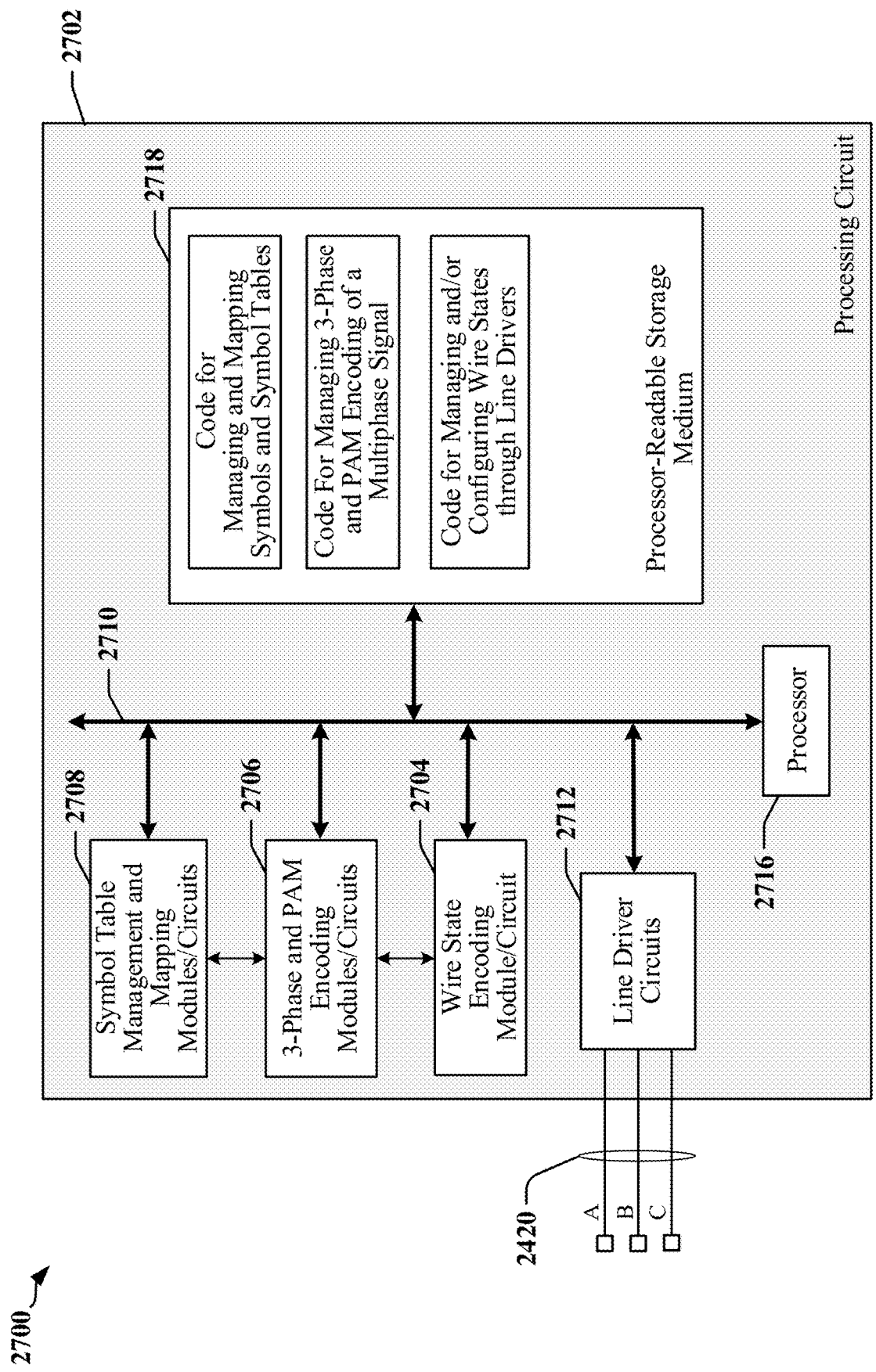
FIG. 27 is a diagram illustrating an example of a hardware implementation for a receiving apparatus in accordance with certain aspects disclosed herein.

FIG. 27 is a diagram illustrating an example of a hardware implementation for an apparatus 2700 employing a processing circuit 2702. The processing circuit typically has a processor 2716 that may include one or more of a microprocessor, microcontroller, digital signal processor, a sequencer and a state machine. The processing circuit 2702 may be implemented with a bus architecture, represented generally by the bus 2710. The bus 2710 may include any number of interconnecting buses and bridges depending on the specific application of the processing circuit 2702 and the overall design constraints. The bus 2710 links together various circuits including one or more processors and/or hardware modules, represented by the processor 2716, the modules or circuits 2704, 2706 and 2708, line drivers 2712 that are configured to drive the wires of a 3-wire link 2420 (see FIG. 24, for example), and the processor-readable storage medium 2718. The bus 2710 may also link various other circuits such as timing sources, peripherals, voltage regulators, and power management circuits, which are well known in the art, and therefore, will not be described any further.

The processor 2716 is responsible for general processing, including the execution of software stored on the processor-readable storage medium 2718. The software, when executed by the processor 2716, causes the processing circuit 2702 to perform the various functions described supra for any particular apparatus. The processor-readable storage medium 2718 may also be used for storing data that is manipulated by the processor 2716 when executing software, including symbol table and intermediate indices used to access the symbol tables. The processing circuit 2702 further includes at least one of the modules 2704, 2706 and 2708. The modules 2704, 2706 and 2708 may be implemented as software modules running in the processor 2716, resident/stored in the processor-readable storage medium 2718, one or more hardware modules coupled to the processor 2716, or some combination thereof. The modules 2704, 2706 and/or 2708 may include microcontroller instructions, state machine configuration parameters, or some combination thereof.

In one configuration, the apparatus 2700 may be configured for data communication over a multi-wire interface. The apparatus 2700 may include a module and/or circuit 2704 that is configured to control the line drivers 2712 in a manner that supports multiple signaling states on each wire of the 3-wire link 2420. In one example, the line drivers 2712 provide 7 or more signaling states on each wire, and each wire is driven to a different signaling state than the other wires in the 3-wire link 2420. The apparatus 2700 may include encoding modules and/or circuits 2706 configured to encode data in symbols using a combination of 3-phase encoding and PAM-4 modulation. In one example, the encoding modules and/or circuits 2706 may include, manage or cooperate with symbol table management and mapping modules and/or circuits 2708.

In one example, the apparatus 2700 has a plurality of line drivers configured to couple the apparatus to a 3-wire link 2420, and a data encoder. The data encoder may be configured to encode at least 3 bits of binary data in each transition between two symbols that are consecutively transmitted by the plurality of line drivers over the 3-wire link 2420 such that each pair of consecutively-transmitted symbols includes two different symbols. In one example, each symbol defines signaling states of the 3-wire link 2420 during an associated symbol transmission interval such that each wire of the 3-wire link 2420 is in a different signaling state from the other wires of the 3-wire link 2420 during the associated symbol transmission interval.

In some implementations, at least one symbol transmitted over the 3-wire link 2420 defines non-zero current flows for each wire of the 3-wire link 2420, where a sum of the non-zero current flows is zero. The signaling states of the wires of the 3-wire link 2420 may include seven voltage levels. In some instances, at least one symbol transmitted over the 3-wire link 2420 defines a voltage level for each wire of the 3-wire link 2420 that is above or below a middle voltage level of the seven voltage levels.

In some implementations, the data encoder is further configured to use a combination of 3-phase encoding and PAM to encode the binary data. The apparatus 2700 may transmit a first symbol over the 3-wire link 2420. In one example, the data encoder selects the first symbol from a set of 12 symbols when the data encoder is configured for a first encoding scheme. In another example, the data encoder selects the first symbol from a set of 18 symbols when the data encoder is configured for a second encoding scheme In another example, the data encoder selects the first symbol from a set of 42 symbols when the data encoder is configured for a first encoding scheme. The apparatus 2700 may transmit a second symbol over the 3-wire link 2420. The data encoder may be further configured to select the second symbol from a set of available symbols that excludes the first symbol.

In some implementations, the apparatus 2700 has a wire state encoder configured to receive a sequence of symbols from the data encoder, and provide control signals to the plurality of line drivers that cause each of the plurality of line drivers to drive one wire of the 3-wire link 2420 to a signaling state defined by the each symbol during a symbol transmission interval provided for each symbol in the sequence of symbols.

In one example, the plurality of line drivers includes three voltage drivers, and the wire state encoder may be further configured to configure a plurality of switches in each voltage driver such that each wire of the 3-wire link 2420 is coupled to one or more voltage levels through two or more resistors in one of the three voltage drivers during each symbol transmission interval. The plurality of switches in each voltage driver may be configured in each symbol transmission interval such that a combination of resistors coupled to a corresponding wire of the 3-wire link 2420 matches a characteristic impedance of the corresponding wire of the 3-wire link 2420.

In one example, the plurality of line drivers includes three current drivers, and the wire state encoder is further configured to configure a plurality of switches that causes each of the three current drivers to provide a current in a corresponding wire of the 3-wire link 2420 that has a magnitude defined by a symbol being transmitted in a current symbol transmission interval. In some implementations, resistors coupled to the 3-wire link 2420, each resistor matching a characteristic impedance of the 3-wire link 2420.

In some instances, control signals may be provided to the line drivers that cause each of the line drivers to drive one wire of the 3-wire link to a signaling state defined by a symbol transmitted during a symbol transmission interval. When voltage-mode line drivers are used, the control signals may configure a plurality of switches in the line drivers such that each wire of the 3-wire link is coupled to one or more voltage levels through one or more resistors during each symbol transmission interval. The plurality of switches may be configured in each symbol transmission interval such that each combination of resistors coupled to a wire of the 3-wire link matches a characteristic impedance of the 3-wire link. When current-mode line drivers are used, the control signals may configure a plurality of switches in the plurality of line drivers such that each wire of the 3-wire link is coupled to a current driver that provides a current in the each wire, where the current has a magnitude defined by a symbol being transmitted in in its corresponding symbol transmission interval. The current-mode line drivers may include resistors that are coupled to the 3-wire link to match a characteristic impedance of the 3-wire link.

The processor-readable storage medium 2718 may store instructions and other information related to the method illustrated in FIG. 26. For example, the processor-readable storage medium 2718 may include instructions that cause the processing circuit 2702 to transmit a plurality of symbols over a 3-wire link 2420, and encode at least 3 bits of binary data in each transition between two symbols that are consecutively transmitted over the 3-wire link 2420. Each pair of consecutively-transmitted symbols may include two different symbols. Each symbol may define signaling states of the 3-wire link 2420 during an associated symbol transmission interval such that each wire of the 3-wire link 2420 is in a different signaling state from the other wires of the 3-wire link 2420 during the associated symbol transmission interval.

In some implementations, at least one symbol transmitted over the 3-wire link 2420 defines non-zero current flows for each wire of the 3-wire link 2420, where a sum of the non-zero current flows is zero. The signaling states of the wires of the 3-wire link 2420 may include seven voltage levels, where at least one symbol transmitted over the 3-wire link 2420 defines a voltage level for each wire of the 3-wire link 2420 that is above or below a middle voltage level of the seven voltage levels. Each symbol may be selected for transmission from a set of 18 symbols defined for the 3-wire link 2420.

In one example, the storage medium 2718 includes instructions that cause the processing circuit 2702 to configure the data to use a combination of 3-phase encoding and PAM to encode the binary data. The instructions may cause the processing circuit 2702 to transmit a first symbol over the 3-wire link 2420. In one example, the first symbol is selected from a set of 12 symbols when the data encoder is configured for a first encoding scheme. In another example, the first symbol is selected from a set of 18 symbols when the data encoder is configured for a second encoding scheme. In another example, the first symbol is selected from a set of 42 symbols when the data encoder is configured for a first encoding scheme. The instructions may cause the processing circuit 2702 to transmit a second symbol over the 3-wire link 2420. The second symbol may be selected from a set of available symbols that excludes the first symbols.

In certain implementations, the storage medium 2718 includes instructions that cause the processing circuit 2702 to provide control signals to a plurality of line drivers that cause each of the plurality of line drivers to drive one wire of the 3-wire link 2420 to a signaling state defined by the each symbol during a symbol transmission interval provided for the each symbol. In one example, the plurality of line drivers includes three voltage drivers, and the storage medium 2718 may include instructions that cause the processing circuit 2702 to configure a plurality of switches in each voltage driver such that each wire of the 3-wire link 2420 is coupled to one or more voltage levels through two or more resistors in one of the three voltage drivers during each symbol transmission interval. The storage medium 2718 may include instructions that cause the processing circuit 2702 to configure the plurality of switches in each voltage driver in each symbol transmission interval such that a combination of resistors coupled to a corresponding wire of the 3-wire link 2420 matches a characteristic impedance of the corresponding wire of the 3-wire link 2420.

In one example, the plurality of line drivers includes three current drivers, and the storage medium 2718 may include instructions that cause the processing circuit 2702 to configure a plurality of switches that causes each of the three current drivers to provide a current in a corresponding wire of the 3-wire link 2420 that has a magnitude defined by a symbol being transmitted in a current symbol transmission interval.

In some instances, control signals may be provided to the line drivers that cause each of the line drivers to drive one wire of the 3-wire link to a signaling state defined by a symbol transmitted during a symbol transmission interval. When voltage-mode line drivers are used, the control signals may configure a plurality of switches in the line drivers such that each wire of the 3-wire link is coupled to one or more voltage levels through one or more resistors during each symbol transmission interval. The plurality of switches may be configured in each symbol transmission interval such that each combination of resistors coupled to a wire of the 3-wire link matches a characteristic impedance of the 3-wire link. When current-mode line drivers are used, the control signals may configure a plurality of switches in the plurality of line drivers such that each wire of the 3-wire link is coupled to a current driver that provides a current in the each wire, where the current has a magnitude defined by a symbol being transmitted in in its corresponding symbol transmission interval. The current-mode line drivers may include resistors that are coupled to the 3-wire link to match a characteristic impedance of the 3-wire link.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for data communication, comprising:

a plurality of line drivers configured to couple the apparatus to a 3-wire link; and a data encoder configured to use a combination of 3-phase encoding and pulse amplitude modulation to encode at least 3 bits of binary data in each transition between two symbols that are consecutively transmitted by the plurality of line drivers over the 3-wire link, and to provide a first symbol for transmission over the 3-wire link, wherein the first symbol is selected from a set of 12 symbols when the data encoder is configured for a first encoding scheme, from a set of 18 symbols when the data encoder is configured for a second encoding scheme, and from a set of 42 symbols when the data encoder is configured for a third encoding scheme, wherein each symbol transmitted over the 3-wire link defines signaling states of the 3-wire link during an associated symbol transmission interval such that each wire of the 3-wire link is in a different signaling state from the other wires of the 3-wire link during the associated symbol transmission interval, and wherein each pair of consecutively-transmitted symbols comprises two different symbols.

2. The apparatus of claim 1, wherein at least one symbol transmitted over the 3-wire link defines non-zero current flows for each wire of the 3-wire link, and wherein a sum of the non-zero current flows is zero.

3. The apparatus of claim 1, wherein signaling states defined for the wires of the 3-wire link include at least 5 voltage or current levels, and wherein at least one symbol transmitted over the 3-wire link defines a voltage or current level for each wire of the 3-wire link that is above or below a middle voltage level of the at least 5 voltage or current levels.

4. The apparatus of claim 1, wherein the data encoder is further configured to:

transmit a second symbol over the 3-wire link, wherein the second symbol is selected from a set of available symbols that excludes the first symbol.

5. The apparatus of claim 1, further comprising a wire state encoder configured to:
receive a sequence of symbols from the data encoder; and
provide control signals to the plurality of line drivers that cause each of the plurality of line drivers to drive one wire of the 3-wire link to signaling states defined by the sequence of symbols.

6. An apparatus for data communication, comprising:
a plurality of line drivers configured to couple the apparatus to a 3-wire link;
a data encoder configured to use a combination of 3-phase encoding and pulse amplitude modulation to encode at least 3 bits of binary data in each transition between two symbols that are consecutively transmitted by the plurality of line drivers over the 3-wire link,
wherein each symbol transmitted over the 3-wire link defines signaling states of the 3-wire link during an associated symbol transmission interval such that each wire of the 3-wire link is in a different signaling state from the other wires of the 3-wire link during the associated symbol transmission interval, and
wherein each pair of consecutively-transmitted symbols comprises two different symbols; and
a wire state encoder configured to receive a sequence of symbols from the data encoder, and to provide control signals to the plurality of line drivers that cause each of the plurality of line drivers to drive one wire of the 3-wire link to signaling states defined by the sequence of symbols, wherein the control signals configure a plurality of switches in the plurality of line drivers such that each wire of the 3-wire link is coupled to one or more voltage levels through one or more resistors during each symbol transmission interval.

7. The apparatus of claim 6, wherein the plurality of switches is configured in each symbol transmission interval such that each combination of resistors coupled to a wire of the 3-wire link matches a characteristic impedance of the 3-wire link.

8. An apparatus for data communication, comprising:
a plurality of line drivers configured to couple the apparatus to a 3-wire link;
a data encoder configured to use a combination of 3-phase encoding and pulse amplitude modulation to encode at least 3 bits of binary data in each transition between two symbols that are consecutively transmitted by the plurality of line drivers over the 3-wire link,
wherein each symbol transmitted over the 3-wire link defines signaling states of the 3-wire link during an associated symbol transmission interval such that each wire of the 3-wire link is in a different signaling state from the other wires of the 3-wire link during the associated symbol transmission interval, and
wherein each pair of consecutively-transmitted symbols comprises two different symbols; and
a wire state encoder configured to receive a sequence of symbols from the data encoder, and to provide control signals to the plurality of line drivers that cause each of the plurality of line drivers to drive one wire of the 3-wire link to signaling states defined by the sequence of symbols, wherein the control signals configure a plurality of switches in the plurality of line drivers such that each wire of the 3-wire link is coupled to a current driver that provides a current in the each wire, the current having a magnitude defined by a symbol being transmitted in a corresponding symbol transmission interval.

9. The apparatus of claim 8, wherein each wire of the 3-wire link is coupled to a resistor that matches a characteristic impedance of the 3-wire link.

10. A method for data communication, comprising:
transmitting a plurality of symbols over a 3-wire link, wherein each symbol defines signaling states of the 3-wire link during an associated symbol transmission interval such that each wire of the 3-wire link is in a different signaling state from the other wires of the 3-wire link during the associated symbol transmission interval;
encoding at least 3 bits of binary data in each transition between two symbols that are consecutively transmitted over the 3-wire link using a combination of 3-phase encoding and pulse amplitude modulation, wherein each pair of consecutively-transmitted symbols comprises two different symbols; and
providing a first symbol for transmission over the 3-wire link,
wherein the first symbol is selected from a set of 12 symbols when a first encoding scheme is used, wherein the first symbol is selected from a set of 18 symbols when a second encoding scheme is used, and wherein the first symbol is selected from a set of 42 symbols when a third encoding scheme is used.

11. The method of claim 10, wherein at least one symbol transmitted over the 3-wire link defines non-zero current flows for each wire of the 3-wire link, and wherein a sum of the non-zero current flows is zero.

12. The method of claim 10, wherein signaling states defined for the wires of the 3-wire link include at least 5 voltage or current levels, and wherein at least one symbol transmitted over the 3-wire link defines a voltage or current level for each wire of the 3-wire link that is above or below a middle voltage level of the at least 5 voltage or current levels.

13. The method of claim 10, further comprising:
transmitting a second symbol over the 3-wire link, wherein the second symbol is selected from a set of available symbols that excludes the first symbol.

14. The method of claim 10, further comprising:
providing control signals to a plurality of line drivers that cause each of the plurality of line drivers to drive one wire of the 3-wire link to a signaling state defined by a symbol transmitted during a symbol transmission interval.

15. The method of claim 14, wherein the control signals configure a plurality of switches in the plurality of line drivers such that each wire of the 3-wire link is coupled to one or more voltage levels through one or more resistors during each symbol transmission interval.

16. The method of claim 15, wherein the plurality of switches is configured in each symbol transmission interval such that each combination of resistors coupled to a wire of the 3-wire link matches a characteristic impedance of the 3-wire link.

17. The method of claim 14, wherein the control signals configure a plurality of switches in the plurality of line drivers such that each wire of the 3-wire link is coupled to a current driver that provides a current in the each wire, the current having a magnitude defined by a symbol being transmitted in in its corresponding symbol transmission interval.

18. The method of claim 17, wherein resistors coupled to the 3-wire link match a characteristic impedance of the 3-wire link.

19. A non-transitory processor-readable storage medium comprising code for:
transmitting a plurality of symbols over a 3-wire link, wherein each symbol defines signaling states of the 3-wire link during an associated symbol transmission interval such that each wire of the 3-wire link is in a different signaling state from the other wires of the 3-wire link during the associated symbol transmission interval;
encoding at least 3 bits of binary data in each transition between two symbols that are consecutively transmitted over the 3-wire link using a combination of 3-phase encoding and pulse amplitude modulation, wherein each pair of consecutively-transmitted symbols comprises two different symbols;
providing a first symbol for transmission over the 3-wire link, wherein the first symbol is selected from a set of 12 symbols when a first encoding scheme is used, wherein the first symbol is selected from a set of 18 symbols when a second encoding scheme is used, and wherein the first symbol is selected from a set of 42 symbols when a third encoding scheme is used; and
transmitting a second symbol over the 3-wire link, wherein the second symbol is selected from a set of available symbols that excludes the first symbol.

20. The storage medium of claim 19, wherein at least one symbol transmitted over the 3-wire link defines non-zero current flows for each wire of the 3-wire link, and wherein a sum of the non-zero current flows is zero.

21. The storage medium of claim 19, wherein the signaling states of the wires of the 3-wire link include at least 5 voltage or current levels, and wherein at least one symbol transmitted over the 3-wire link defines a voltage or current level for each wire of the 3-wire link that is above or below a middle voltage level of the at least 5 voltage or current levels.

22. The storage medium of claim 19, further comprising code for:
providing control signals to a plurality of line drivers that cause each of the plurality of line drivers to drive one wire of the 3-wire link to a signaling state defined by a symbol transmitted during a symbol transmission interval,
wherein the control signals configure a plurality of switches in the plurality of line drivers such that each wire of the 3-wire link is coupled to one or more voltage levels through one or more resistors during each symbol transmission interval, and
wherein the plurality of switches is configured in each symbol transmission interval such that each combination of resistors coupled to a wire of the 3-wire link matches a characteristic impedance of the 3-wire link.

23. The storage medium of claim 19, further comprising code for:
providing control signals to a plurality of line drivers that cause each of the plurality of line drivers to drive one wire of the 3-wire link to signaling states defined by a sequence of symbols,
wherein the control signals configure a plurality of switches in the plurality of line drivers such that each wire of the 3-wire link is coupled to a current driver that provides a current in the each wire, the current having a magnitude defined by a symbol being transmitted in its corresponding symbol transmission interval.

* * * * *